United States Patent
Homma

(10) Patent No.: US 11,487,193 B2
(45) Date of Patent: Nov. 1, 2022

(54) PROJECTOR DEVICE AND CONTROL METHOD

(71) Applicant: SONY CORPORATION, Tokyo (JP)

(72) Inventor: Keisuke Homma, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/305,311

(22) PCT Filed: Apr. 28, 2017

(86) PCT No.: PCT/JP2017/017004
§ 371 (c)(1),
(2) Date: Nov. 28, 2018

(87) PCT Pub. No.: WO2018/008246
PCT Pub. Date: Jan. 11, 2018

(65) Prior Publication Data
US 2020/0041881 A1    Feb. 6, 2020

(30) Foreign Application Priority Data
Jul. 7, 2016    (JP) .............................. JP2016-135011

(51) Int. Cl.
*G03B 21/20* (2006.01)
*G03B 21/16* (2006.01)
*H04N 9/31* (2006.01)

(52) U.S. Cl.
CPC ........... *G03B 21/16* (2013.01); *G03B 21/204* (2013.01); *H04N 9/3155* (2013.01); *H04N 9/3161* (2013.01); *H04N 9/3182* (2013.01)

(58) Field of Classification Search
CPC .. G03B 21/16; G03B 21/204; G03B 21/2033; G03B 21/2006; G03B 21/2053;
(Continued)

(56) References Cited

U.S. PATENT DOCUMENTS

| 6,467,911 B1* | 10/2002 | Ueyama | F21V 17/00 |
| | | | 348/E5.137 |
| 2003/0137640 A1* | 7/2003 | Nakano | G03B 21/18 |
| | | | 353/57 |

(Continued)

FOREIGN PATENT DOCUMENTS

| CN | 101523286 A | 9/2009 |
| CN | 101620356 A | 1/2010 |

(Continued)

OTHER PUBLICATIONS

International Search Report dated Aug. 1, 2017, in PCT/JP2017/017004, filed Apr. 28, 2017.

*Primary Examiner* — John W Miller
*Assistant Examiner* — Humam M Satti
(74) *Attorney, Agent, or Firm* — Oblon, McClelland, Maier & Neustadt, L.L.P.

(57) ABSTRACT

An improvement in quality is achieved by improving a contrast ratio. Therefore, in a projector device including a light source device using a solid-state light source (AR) includes a temperature adjustment device (190) capable of setting a state in which a temperature of at least the solid-state light source is caused to increase. Then, a determination unit (12) determines a luminance state of an image and a control unit (16) controls a heat state of the solid-state light source (AR) by controlling the temperature adjustment device (190) on the basis of a determination result. In particular, by increasing the temperature of the solid-state light source (AR) in accordance with an image, light emission efficiency is lowered to decrease luminance.

12 Claims, 15 Drawing Sheets

(58) Field of Classification Search
CPC .... G03B 21/206; G03B 21/43; H04N 9/3155; H04N 9/3161; H04N 9/3182; H04N 9/3194; H04N 9/3158; H04N 9/3144; G09G 5/00; H05B 41/00–46
See application file for complete search history.

(56) References Cited

U.S. PATENT DOCUMENTS

| | | | | |
|---|---|---|---|---|
| 2005/0242741 | A1* | 11/2005 | Shiota | H04N 9/31 315/112 |
| 2005/0253160 | A1 | 11/2005 | Strikovski | |
| 2007/0152934 | A1* | 7/2007 | Maeda | G09G 3/3233 345/92 |
| 2010/0020008 | A1* | 1/2010 | Kobayashi | G09G 3/3413 345/102 |
| 2010/0171935 | A1 | 7/2010 | Yamagishi et al. | |
| 2011/0001937 | A1* | 1/2011 | Matsumoto | G03B 21/16 353/54 |
| 2012/0044462 | A1* | 2/2012 | Kaji | H04N 9/3144 353/31 |
| 2012/0050351 | A1* | 3/2012 | Dobler | G03B 21/16 345/690 |
| 2012/0170004 | A1* | 7/2012 | Park | G03B 21/16 353/31 |
| 2013/0107220 | A1* | 5/2013 | Furukawa | H04N 9/3155 353/20 |
| 2013/0128457 | A1* | 5/2013 | Shioya | G02F 1/133385 361/695 |
| 2013/0242265 | A1* | 9/2013 | Kato | H04N 9/3144 353/31 |
| 2014/0253527 | A1* | 9/2014 | Ogi | G09G 5/02 345/207 |
| 2014/0313490 | A1* | 10/2014 | Miyamoyo | H05B 47/11 353/52 |
| 2014/0333905 | A1 | 11/2014 | Sugiyama | |
| 2015/0062903 | A1* | 3/2015 | Hu | F21V 13/08 362/259 |
| 2016/0342076 | A1* | 11/2016 | Katou | G02B 7/008 |

FOREIGN PATENT DOCUMENTS

| | | | | |
|---|---|---|---|---|
| CN | 102112917 | A | 6/2011 | |
| CN | 103091951 | A | 5/2013 | |
| CN | 104144309 | A | 11/2014 | |
| CN | 105556389 | A | 5/2016 | |
| JP | 2010-217250 | A | 9/2010 | |
| JP | 2014-112124 | A | 6/2014 | |
| JP | 2014219493 | A | * 11/2014 | ............... G03B 9/24 |
| JP | 2014-238485 | A | 12/2014 | |
| JP | 2015-222305 | A | 12/2015 | |
| JP | 2016-12755 | A | 1/2016 | |
| WO | WO 2009/008166 | A1 | 1/2009 | |
| WO | WO-2015115214 | A1 | 8/2015 | |

* cited by examiner

PROJECTOR DEVICE AND CONTROL METHOD

TECHNICAL FIELD

The present disclosure relates to a projector device and a control method therefor, and particularly, to a technical field of a projector device using a solid-state light source.

BACKGROUND ART

In recent years, solid-state light sources such as laser diodes (LDs) or light-emitting diodes (LEDs) have been used as light sources in projector devices. Patent Literature 1 discloses a projector device in which a solid-state light source is used.

In addition, some solid-state light sources of which light emission efficiency varies depending on temperature states are known.

CITATION LIST

Patent Literature

Patent Literature 1: JP 2014-238485A

DISCLOSURE OF INVENTION

Technical Problem

Incidentally, a contrast ratio is one of the indexes of performance of projector devices. In particular, a dynamic contrast ratio is generally used as a numerical value indicating a multiples of a luminance difference when a whole screen black display (whole black image) state and a whole screen white display (whole white image) state are displayed.

Since a contrast ratio has a considerable influence on quality, an improvement in the contrast ratio is strongly requested in projector devices.

Accordingly, the present disclosure proposes a technology for improving a contrast ratio in a projector device and realizing an improvement in quality.

Solution to Problem

A projector device according to the present technology includes: a light source device configured to use a solid-state light source; a temperature adjustment device capable of setting a state in which a temperature of at least the solid-state light source is caused to increase; a determination unit configured to determine a luminance state of an image; and a control unit configured to control the temperature adjustment device on the basis of a determination result of the determination unit.

The temperature adjustment device can promote an increase in the temperature of at least the solid-state light source or can set a state in which the increase in the temperature of the solid-state light source is permitted. In addition, the setting of the state in which the temperature of the solid-state light source is caused to increase also includes a state in which warming or the like is performed in a situation in which the temperature is dropped and the temperature is consequently maintained. That is, the temperature adjustment device is a device capable of realizing an increase in the temperature or maintenance of the temperature of the solid-state light source. Thus, when the luminance state of the image to be projected is a predetermined state, the temperature of the solid-state light source is increased to lower light emission efficiency.

In the projector device according to the present technology described above, it is conceivable that an image generation unit configured to generate an image using light sent from the light source device; and a projection unit configured to project the image generated by the image generation unit are included, and the control unit controls the temperature adjustment device on the basis of a determination result of a luminance state determined by the determination unit on the image generated by the image generation unit as an image to be projected.

In the case of a structure in which light emitted from the solid-state light source is radiated with regard to the image generated in the image generation unit to generate projection light, the temperature of the solid-state light source is caused to increase to lower the light emission efficiency when the luminance state of the image to be projected is a predetermined state.

In the projector device according to the present technology described above, it is conceivable that, in a case in which the determination unit determines that the image is a low-luminance image, the control unit controls the temperature adjustment device to set a state in which the temperature of the solid-state light source is caused to increase.

That is, in the case of the low-luminance image, the temperature of the solid-state light source is caused to increase to lower the light emission efficiency.

In the projector device according to the present technology described above, it is conceivable that, in a case in which an image is a whole black image, the determination unit determines that the image is a low-luminance image.

That is, in the case of the whole black image, the light emission efficiency is caused to be lowered by causing the temperature of the solid-state light source to increase.

In the projector device according to the present technology described above, it is conceivable that, in a case in which the determination unit determines that the image is not at least a low-luminance image, the control unit controls the temperature adjustment device to set a state in which the temperature of the solid-state light source is caused to decrease.

That is, in a case in which the image is not the low-luminance image, an increase in the temperature of the solid-state light source is caused to be avoided to increase the light emission efficiency.

In the projector device according to the present technology described above, it is conceivable that, in a case in which the determination unit determines that an image is a whole white image, the control unit controls the temperature adjustment device to set a state in which the temperature of the solid-state light source is caused to decrease.

That is, in the case of the whole white image, an increase in the temperature of the solid-state light source is caused to be avoided to increase the light emission efficiency.

In the projector device according to the present technology described above, it is conceivable that the determination unit determines the luminance state of the image in a frame unit of an image signal for generating a projection image.

A luminance signal value (gray scale value) is analyzed using each frame or intermittent frames of the image signal as a frame unit and it is determined whether or not an image of the frame is a low-luminance image.

In the projector device according to the present technology described above, it is conceivable that the control unit controls an operation of the temperature adjustment device on the basis of a detection output of a temperature sensor that detects a temperature state of the solid-state light source.

The temperature of the solid-state light source is detected and appropriate temperature adjustment is performed to maintain, increase, or lower the light emission efficiency in accordance with a current temperature of the solid-state light source.

In the projector device according to the present technology described above, it is conceivable that the control unit controls an operation of the temperature adjustment device on the basis of a detection output of luminance of illumination light or projected light detected by a luminance sensor disposed in the image generation unit or the projection unit.

To detect luminance of illumination light or projected light and maintain, increase, or lower the light emission efficiency in accordance with a current luminance of the solid-state light source, appropriate temperature adjustment is performed.

In the projector device according to the present technology described above, it is conceivable that an electric heating coil that heats the solid-state light source is provided as one of the temperature adjustment devices.

The solid-state light source is heated by the electric heating coil to lower light emission efficiency of the solid-state light source.

In the projector device according to the present technology described above, it is conceivable that a heatsink driving unit configured to cause a heatsink corresponding to the solid-state light source to be moved so that heat conduction from the solid-state light source is lowered, as one of the temperature adjustment devices is included.

That is, the heatsink is caused to be moved to control heat transfer efficiency to the heatsink.

A control method according to the present technology is a control method for a projector device including a light source device using a solid-state light source, and includes: determining a luminance state of an image; and controlling a temperature adjustment device on the basis of a determination result of the determination unit, the temperature adjustment device being capable of setting a state in which a temperature of at least the solid-state light source is caused to increase.

That is, when the luminance state of the image to be projected is the predetermined state, the temperature adjustment device is caused to increase the temperature of the solid-state light source and the light emission efficiency is caused to be lowered.

Advantageous Effects of Invention

According to the present technology, by controlling a temperature state of a solid-state light source on the basis of a determination result of a luminance state of an image, it is possible to adjust light emission efficiency of the solid-state light source in accordance with an image. Accordingly, by lowering the light emission efficiency in a dark image or the like, it is possible to improve a contrast ratio and realize an improvement in quality.

Note that the advantageous effects mentioned herein are not necessarily limiting and advantageous effects described in the present disclosure may be achieved.

MODE(S) FOR CARRYING OUT THE INVENTION

Hereinafter, embodiments will be described in the following order.
<1. Configuration of projector device>
<2. First Embodiment>
<3. Second Embodiment>
<4. Third and fourth embodiments>
<5. Fifth embodiment and other process examples>
<6. Conclusion and modification examples>

1. Configuration of Projector Device

Figure 1:
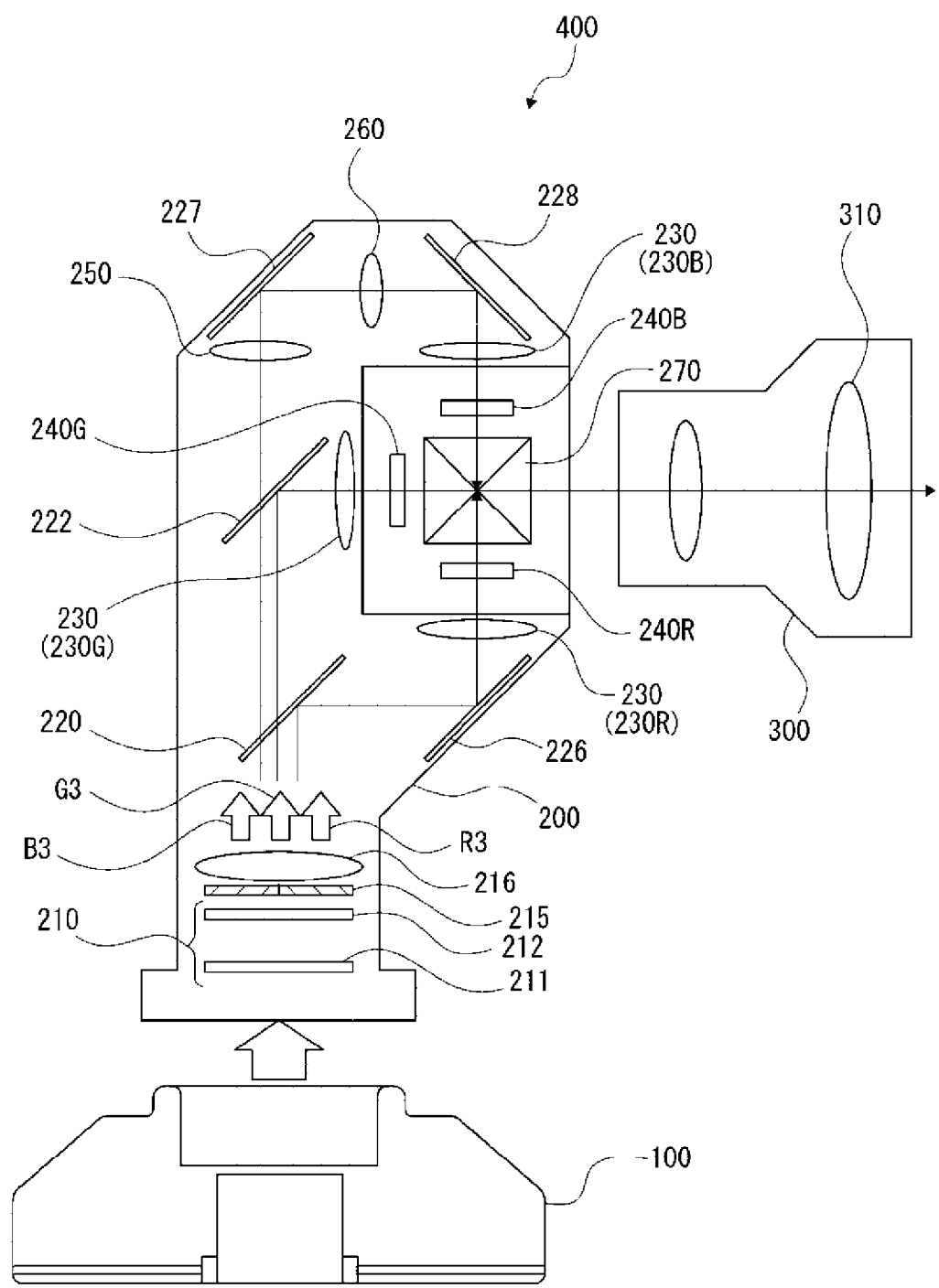
FIG. 1 is an explanatory diagram illustrating a projector device according to an embodiment of the present technology.

A configuration of a projector device according to an embodiment will be described with reference to FIG. 1. FIG. 1 is a schematic diagram illustrating a configuration example of the projector device.

A projector device 400 according to the embodiment includes a light source device 100, an image generation unit 200 that generates an image using light sent from the light source device 100, and a projection unit 300 that projects image light generated by the image generation unit 200.

The image generation unit 200 includes an integrator element 210, a polarization conversion element 215, a condensing lens 216, dichroic mirrors 220 and 222, mirrors 226, 227, and 228, and relay lenses 250 and 260.

In addition, the image generation unit 200 includes field lenses 230 (230R, 230G; and 230B), liquid crystal light valves 240R, 240G; and 240B, and a dichroic prism 270.

The integrator element 210 has a function of overall tuning of incident light radiated from the light source device 100 to the liquid crystal light valves 240R, 240G and 240B in a uniform luminance distribution. For example, the integrator element 210 includes a first fly-eye lens 211 that includes a plurality of microlenses (not illustrated) arrayed 2-dimensionally and a second fly-eye lens 212 that includes a plurality of microlenses arrayed in one-to-one correspondence with the microlenses of the first fly-eye lens 211.

Parallel light incident on the integrator element 210 from the light source device 100 is divided into a plurality of light fluxes by the microlenses of the first fly-eye lens 211 and is formed as an image on the corresponding microlenses of the second fly-eye lens 212. Each of the microlenses of the second fly-eye lens 212 functions as a secondary light source that radiates the plurality of pieces of parallel light as incident light to the polarization conversion element 215.

The polarization conversion element 215 has a function of arranging a polarization state of the incident light incident via the integrator element 210 and the like. The polarization conversion element 215 emits, for example, emission light including blue light B3, green light G3, and red light R3 via the condensing lens 216 disposed on the emission side of the light source device 100.

The dichroic mirrors 220 and 222 have a nature in which color light of a predetermined wavelength region is selectively reflected and light of other wavelength regions is transmitted.

For example, the dichroic mirror 220 selectively reflects the red light R3. The dichroic mirror 222 selectively reflects the green light G3 between the green light G3 and the blue light B3 transmitted through the dichroic mirror 220.

The remaining blue light B3 is transmitted through the dichroic mirror 222. Thus, the light emitted from the light source device 100 is separated into a plurality of pieces of color light with different colors.

The separated red light R3 is reflected by the mirror 226, passes through the field lens 230R to be parallelized, and then is subsequently incident on the liquid crystal light valve 240R for red light modulation.

The green light G3 passes through the field lens 230G to be parallelized, and then is subsequently incident on the liquid crystal light valve 240G for green light modulation.

The blue light B3 passes through the relay lens 250, is reflected by the mirror 227, then further passes through the relay lens 260, and is reflected by the mirror 228. The blue light B3 reflected by the mirror 228 passes through the field lens 230B to be parallelized, and then is subsequently incident on the liquid crystal light valve 240B for blue light modulation.

The liquid crystal light valves 240R, 240G and 240B are electrically connected to a signal source (for example, a driving control unit 10 to be described below in FIG. 5) that supplies an image signal including image information. The liquid crystal light valves 240R, 240G, and 240B modulate incident light for each pixel on the basis of the supplied image signal of each color and generate a red image, a green image, and a blue image, respectively. The modulated light of each color (the formed images) is incident on the dichroic prism 270 to be combined. The dichroic prism 270 combines the light of each color incident from three directions so that the light of each color is superimposed and emits the combined light to the projection unit 300.

The projection unit 300 includes a plurality of lenses 310 and the like and radiates the light combined by the dichroic prism 270 to a screen (not illustrated). Thus, a full-color image is displayed.

Next, a configuration example of the light source device 100 will be described.

Figure 2:
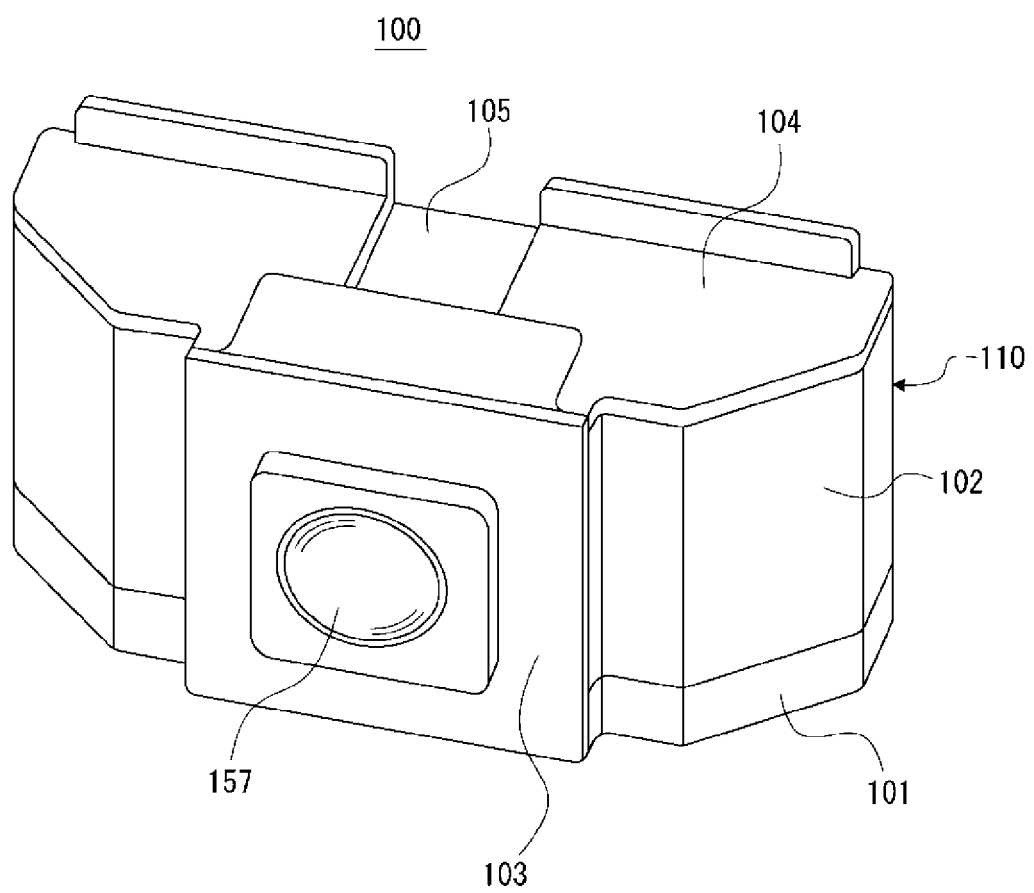
FIG. 2 is a perspective view illustrating a light source device of a projector device according to an embodiment.

FIG. 2 is a perspective view illustrating the light source device 100. The light source device 100 is a type of projector light source device that combines laser light of a blue wavelength region and light of a red wavelength region to light of a green wavelength region generated from a fluorescent material excited by the laser light of the blue wavelength region and emits white light.

As illustrated in FIG. 2, the light source device 100 includes a base 101 provided on a bottom portion and a side wall portion 102 fixed to the base 101. The light source device 100 includes a front surface portion 103 and an upper surface portion 104 connected to the side wall portion 102, and a cover portion 105 connected to the upper surface portion 104. The side wall portion 102, the front surface portion 103, the upper surface portion 104, and the cover portion 105 form a casing portion 110 of the light source device 100.

A fluorescent light collimator lens 157 which is a light emission end is disposed on the front surface portion 103.

Figure 3:
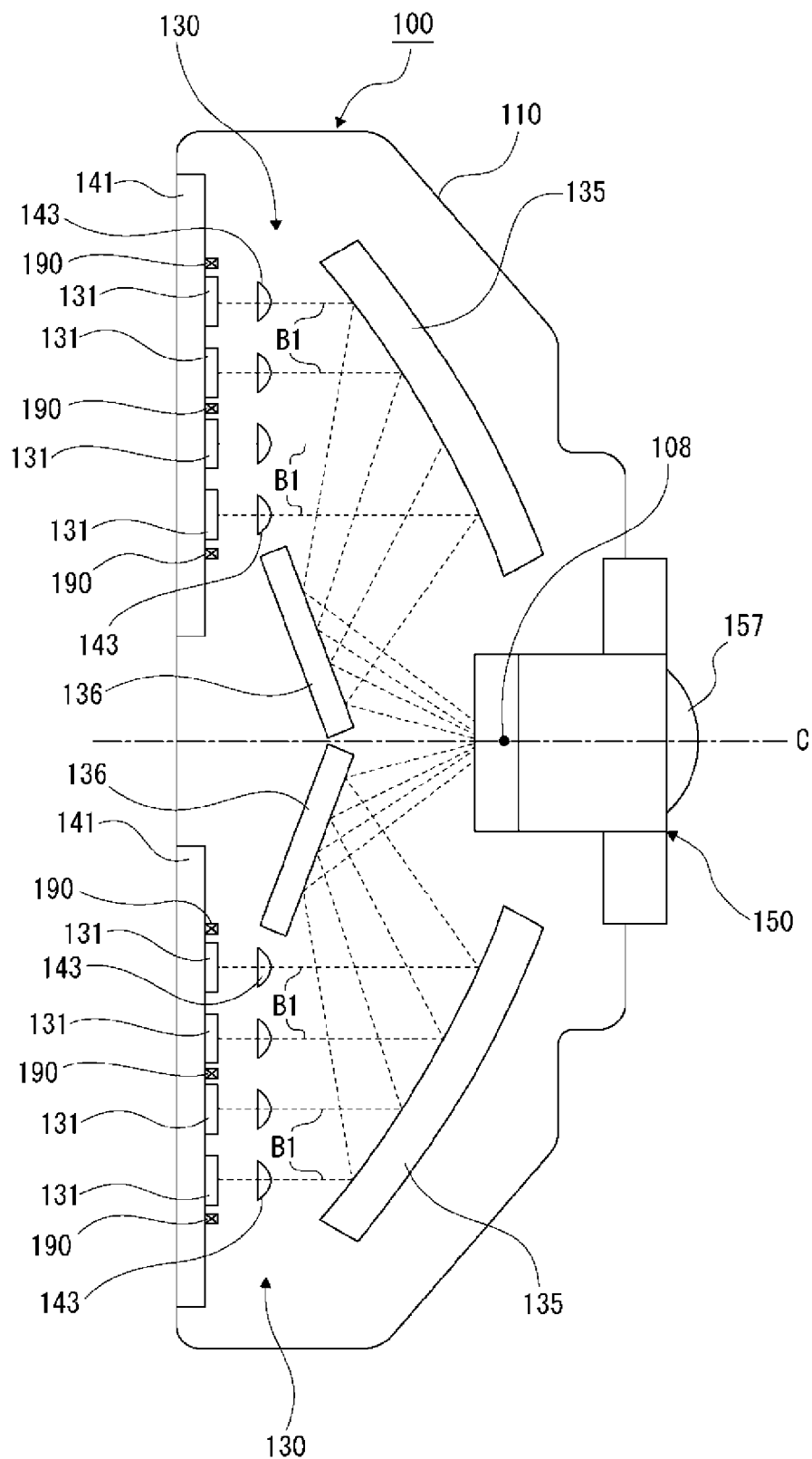
FIG. 3 is an explanatory diagram illustrating an internal structure of the light source device according to the embodiment.

Inside the casing portion 110, for example, as illustrated in FIG. 3, two condensing units 130 that condense light from light sources are formed. The two condensing units 130 are disposed on the rear side of a fluorescent optical unit 150. The condensing units 130 are disposed to be symmetric about an optical axis C.

Each condensing unit 130 includes, for example, a laser light source 131 that emits laser light as a light source emitting excited light of a first wavelength region. For example, a plurality of such laser light sources 131 are provided.

The plurality of laser light sources 131 are, for example, blue laser light sources that oscillate blue laser light B1 having a peak wavelength of light emission intensity within a wavelength region equal to or greater than 400 nm and equal to or less than 500 nm as the first wavelength. As the laser light source 131, another solid-state light source such as an LED may be used rather than a light source that sends out laser light.

The plurality of laser light sources 131 are disposed on a mounting substrate 141.

Note that an example in which electric heating coils 190 are disposed on the mounting substrate 141 is illustrated in the drawing. The electric heating coils 190 are disposed to be able to heat the laser light sources 131.

Although not illustrated, for example, a heatsink 40 (see FIG. 5 to be described below) is disposed in direct or indirect contact with the mounting substrate 141. Exhaust of heat generated by each laser light source 131 is achieved by the heatsink 40.

For each condensing unit 130, a collimator lens 143 is provided to correspond to the position of each laser light source 131. The collimator lens 143 is a rotation-symmetric aspheric lens and forms the blue laser light B1 emitted from each laser light source 131 as a substantially parallel light flux.

In addition, in the condensing unit 130, an aspheric mirror 135 and a planar mirror 136 are included as a condensing optical system that condenses laser light B1 emitted from the plurality of laser light sources 131 to a predetermined condensing area (or a condensing point) 108.

The aspheric mirror 135 reflects the light emitted from the plurality of laser light sources 131 to condense the light to the planar mirror 136. The planar mirror 136 reflects the reflected emitted light so that the emitted light reflected by the aspheric mirror 135 is condensed to the predetermined condensing area 108, as described above. As will be described below, the condensing area 108 is disposed in a fluorophore layer 153 of a fluorophore unit included in the fluorescent optical unit 150.

FIG. 4A schematically illustrates the fluorescent optical unit 150. The fluorescent optical unit 150 includes a fluorophore unit 158 and a fluorescent light collimator lens 157.

The fluorophore unit 158 includes a transparent substrate 151 which is a discoid rotational plate, a motor 152 that serves as a driving unit rotating the transparent substrate 151, and the fluorophore layer 153 that is provided on a one surface side of the transparent substrate 151. The transparent substrate 151 functions as a supporter that supports the fluorophore layer 153. Of both surfaces of the transparent substrate 151, a surface on the side on which the blue laser light B1 is incident is referred to as a first surface and an opposite surface to the first surface is referred to as a second surface to facilitate the description.

FIGS. 4B and 4C are plan views illustrating the first surface and the second surface of the transparent substrate 151. An antireflection layer 155 is provided on the first surface of the transparent substrate 151. The fluorophore layer 153 is provided on the second surface side of the transparent substrate 151 and a dichroic layer 154 (see FIG. 4A) is provided between the transparent substrate 151 and the fluorophore layer 153.

The antireflection layer 155 has a function of causing the blue laser light B1 to be transmitted to suppress reflection of the blue laser light B1. The blue laser light B1 transmitted through the antireflection layer 155, the transparent substrate 151, and the dichroic layer 154 is incident as excited light on the fluorophore layer 153.

The fluorophore layer 153 has a function of causing a part of the blue laser light B1 incident as the excited light (also including scattered and transmitted light) to be transmitted and absorbing the remaining excited light. The absorbed excited light causes the fluorophore layer 153 to generate light having a second wavelength region longer than a wavelength region of the excited light.

The fluorophore layer 153 combines the transmitted blue light B2 and the light having the second wavelength region, here, yellow light including the red light R2 and the green light G2 (for example, a peak wavelength is 500 to 600 nm), and emits the combined light. That is, the fluorophore layer 153 emits white light.

The dichroic layer 154 has a function of causing the blue laser light B1 transmitted through the transparent substrate 151 to be transmitted and reflecting the yellow light generated in the fluorophore layer 153. The dichroic layer 154 is formed by, for example, dielectric multi-layer films.

As illustrated in FIG. 4A, relative disposition of the condensing unit 130 and the fluorescent optical unit 150 is designed so that the condensing area 108 is located at a position at which the fluorophore layer 153 is disposed.

A width of the fluorophore layer 153 in a radial direction is set to be greater than a spot size of the condensing area 108. A width of the dichroic layer 154 in a radial direction is also considered similarly. A width of the antireflection layer 155 in a radial direction is set to be greater than the width of the fluorophore layer 153, but may be the same as the width of the fluorophore layer 153.

A rotational axis 156 of the motor 152 matches a center of the transparent substrate 151 in which these layers are formed. When the excited light is incident on the fluorophore layer 153, the motor 152 causes the transparent substrate 151 to be rotated, so that a radiation position of the excited light is moved on the circumference of the fluorophore layer 153 over time. Thus, it is possible to suppress an increase in a temperature of the radiation position in the fluorophore layer 153 and prevent light emission efficiency of the fluorophore layer 153 from being lowered.

In addition, it takes some time (for example, about several nsec) for fluorophore atoms to absorb the excited light and emit light. Even when subsequent excited light is radiated to the fluorophore atoms during the excitation period, no light is emitted with respect to the excited light. However, since the radiation position of the excited light of the fluorophore layer 153 is moved over time in the embodiment, unexcited fluorophore atoms are sequentially disposed at the radiation position of the excited light, and thus the fluorophore layer 153 can be caused to efficiently emit light. In this way, the motor 152 and the transparent substrate 151 function as a movement mechanism that moves the fluorophore layer 153 over time.

The fluorescent light collimator lens 157 has a function of forming light emitted from the fluorophore layer 153 as substantially parallel light. An optical axis (the optical axis C in FIG. 4A) of the fluorescent light collimator lens 157 is disposed at a position shifted from the rotational axis 156 of the motor 152.

2. First Embodiment

For example, a first embodiment will be described as a projector device 400 that has the structure of the foregoing projection optical system. FIG. 5 illustrates a block diagram illustrating a control configuration of a projector device 400 according to the first embodiment.

Figure 4:
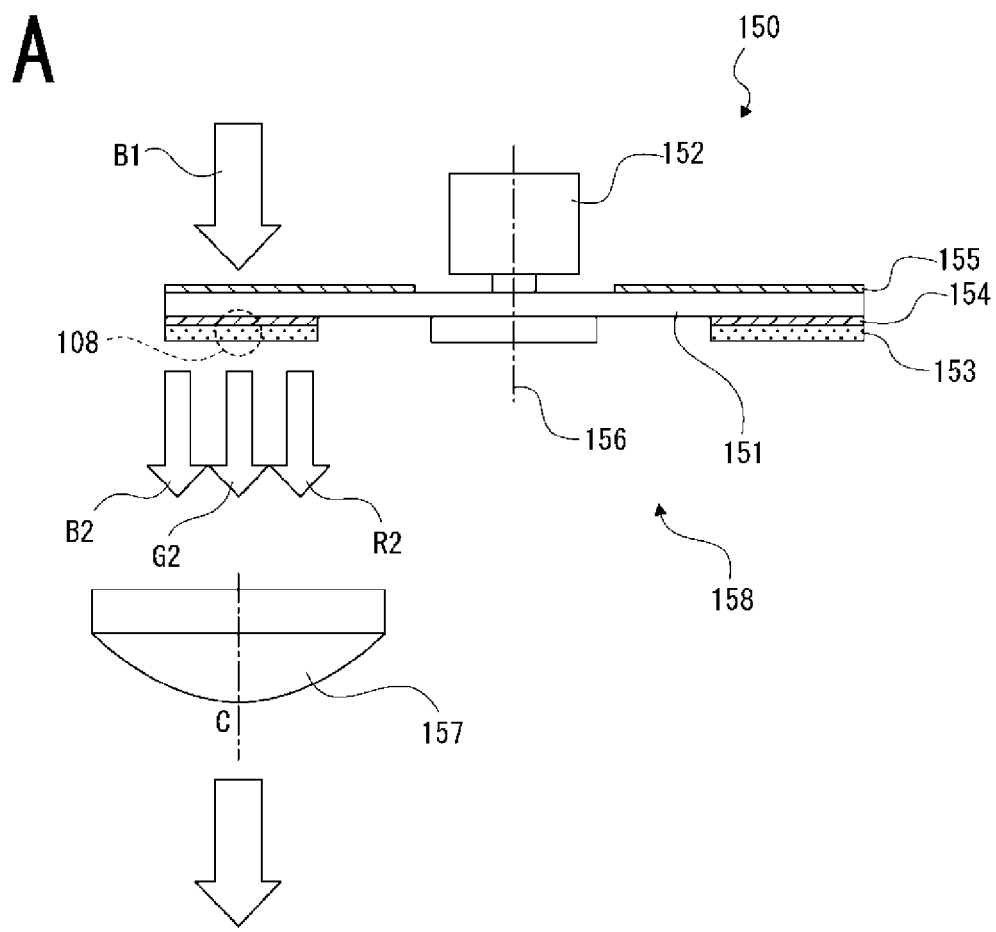
FIG. 4 is an explanatory diagram illustrating light emission of the light source device according to the embodiment.
Figure 4:
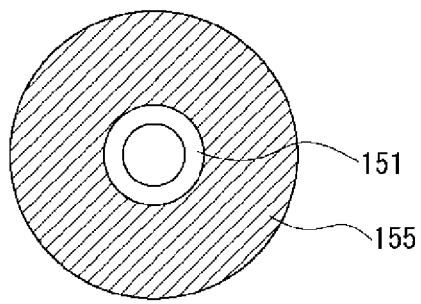
Figure 4:
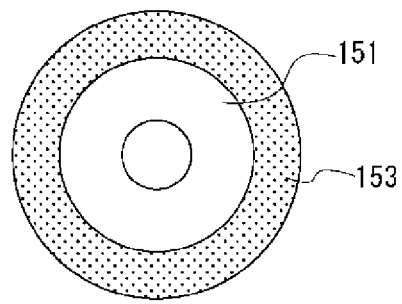
Figure 5:
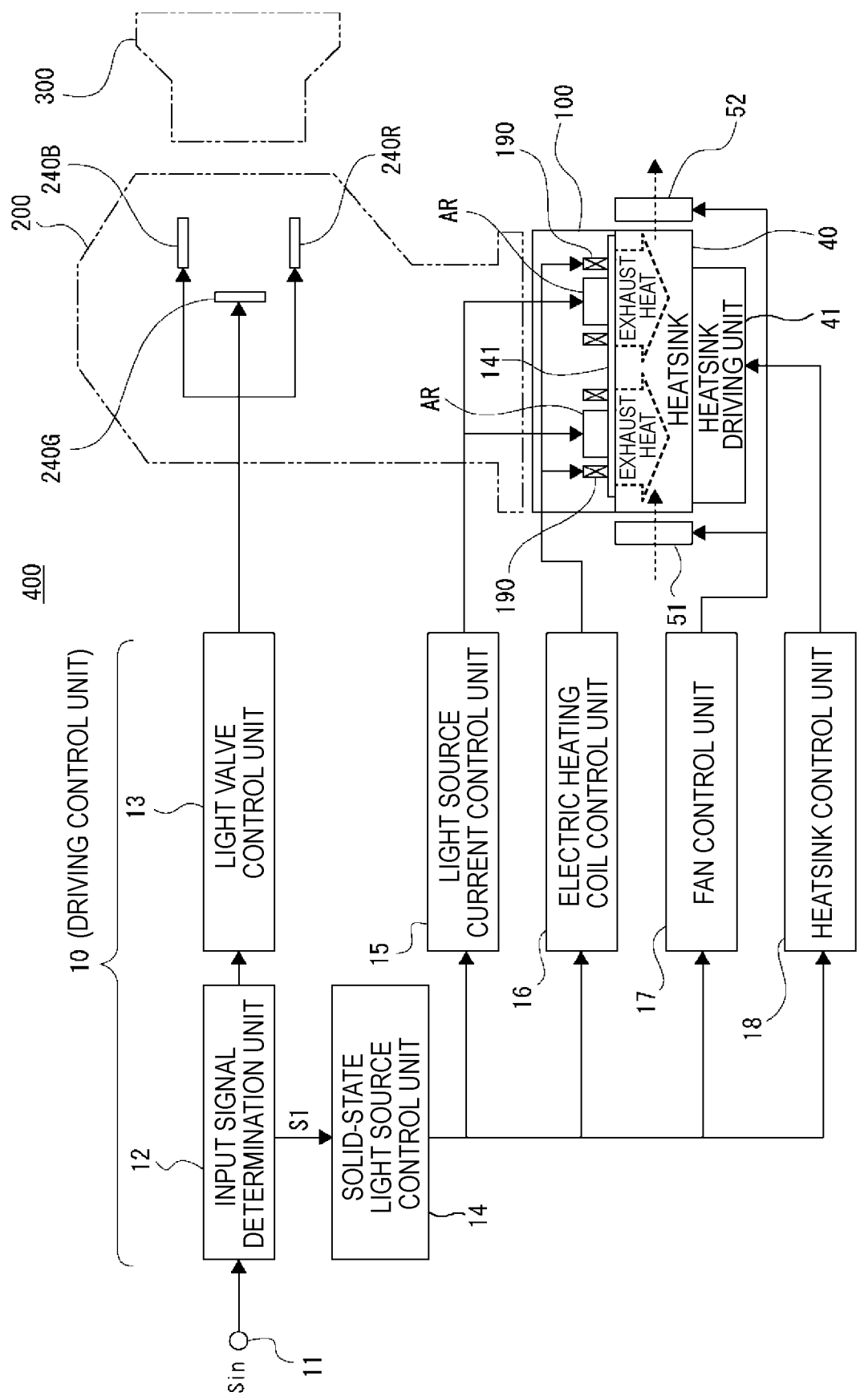
FIG. 5 is a block diagram illustrating a control configuration according to a first embodiment.

Inside the light source device 100, as illustrated in FIGS. 2, 3, and 4, only the mounting substrate 141 illustrated in FIG. 5, a laser light source array AR including the laser light source 131, and electric heating coils 190 in FIG. 5 are illustrated.

In addition, the image generation unit 200 and the projection unit 300 are illustrated in FIG. 1. The internal configuration is omitted, as indicated by a two-dot chain line, and only the liquid crystal light valves 240R, 240G and 240B are illustrated.

The projector device 400 includes, as a driving control unit 10, an input signal determination unit 12, a light valve control unit 13, a solid-state light source control unit 14, a light source current control unit 15, an electric heating coil control unit 16, a fan control unit 17, and a heatsink control unit 18.

In addition, various temperature adjustment devices are mounted on the projector device 400 according to the embodiment to adjust a temperature of the laser light source 131 which is a solid-state light source. FIG. 5 illustrates a heatsink 40 (and a heatsink driving unit 41), the electric heating coils 190, an intake fan 51, and an exhaust fan 52 as examples of the temperature adjustment devices.

Note that at least one temperature adjustment device capable of adjusting a temperature of the laser light source 131 may be provided. In addition, the present technology is not limited to the heatsink 40, the electric heating coils 190, the intake fan 51, and the exhaust fan 52. As modification examples, various temperature adjustment devices that will be described below are considered.

Figure 7:
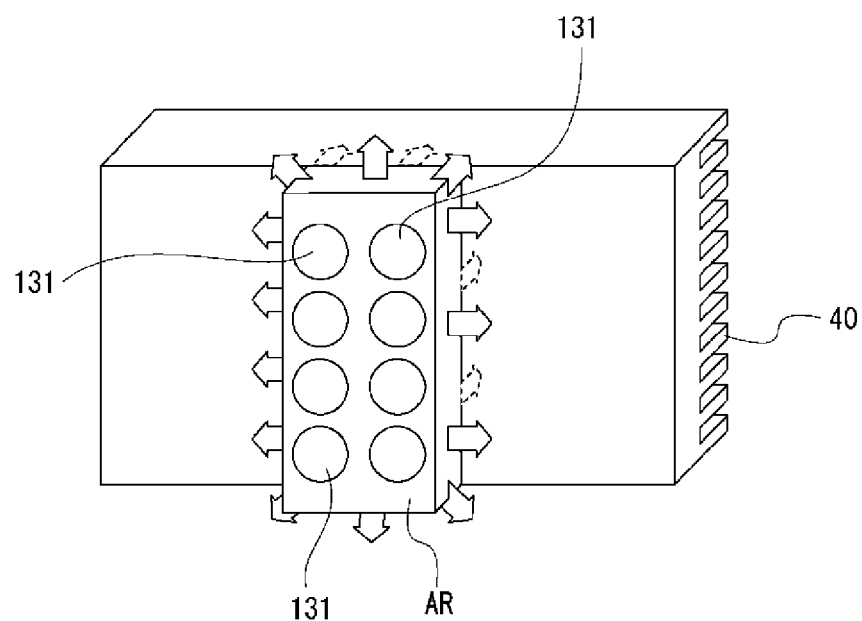
FIG. 7 is an explanatory diagram illustrating temperature adjustment by an electric heating coil according to an embodiment.
Figure 7:
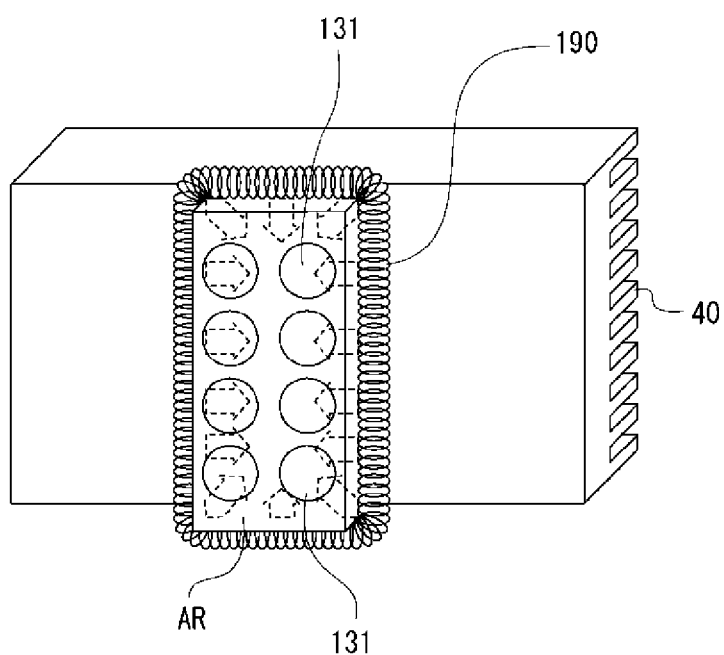

For example, as schematically illustrated in FIG. 7B, the electric heating coil 190 is disposed in the circumference of the laser light source array AR including the plurality of laser light sources 131. By electrifying the electric heating coil 190, generated heat is delivered to the laser light source array AR to heat the laser light source 131.

The heatsink 40 comes into contact with a predetermined position of the light source device 100 and has a function of exhausting the heat delivered from the laser light source 131 to the mounting substrate 141.

In particular, in the embodiment, the heatsink 40 is disposed to be movable by the heatsink driving unit 41. For example, the heatsink 40 is considered to be movable between a state in which the heatsink 40 is in contact with the light source device 100 and a state in which the heatsink 40 is separated from the light source device 100. The heatsink driving unit 41 is formed by a driving unit such as a motor or a solenoid for such a movement operation and a mechanism that maintains the heatsink 40 in a movable state.

The intake fan 51 and the exhaust fan 52 are disposed at one end and the other end of the heatsink 40. An air-blowing path reaching from the intake fan 51 to the side of the exhaust fan 52 is formed in, for example, a space of an uneven heat dissipation surface provided to enlarge a surface area of the heatsink 40 by the intake fan 51 and the exhaust fan 52 to realize an efficient air-cooling structure.

The driving control unit 10 in FIG. 5 performs control such that an image is projected by the projector device 400.

An image signal Sin of an image to be projected is supplied from an image source device (for example, a computer device, an image reproduction device, or the like) (not illustrated) to a terminal 11.

The image signal Sin is considered to be an image signal or the like of 3-system continuous frames as, for example, an R signal, a G signal, and a B signal. Of course, an image signal input in conformity with another signal scheme is converted into the R signal, the G signal, and the B signal in the projector device 400 to serve as the image signal Sin.

The input signal determination unit 12 performs a determination process on the image signal Sin. In the embodiment, as the determination process, for example, a luminance state is determined for each frame image of the image signal Sin and a whole black image, a low-luminance image close to the whole black image, a whole white image, a high-luminance image close to the whole white image, and the like are assumed to be determined. In this determination, signal values of the R signal, the G signal, and the B signal serving as the image signal Sin can be analyzed.

The whole black image or the whole white image can be determined from the signal values of the image signal Sin itself. In addition, various kinds of luminance (gray scales) are included as actual image content, and it is considered that calculation or the like of luminance average values or dominant luminance values of all the pixels is performed on the low-luminance image close to the whole black image, the high-luminance image close to the whole white image, and the like and whether a center of a luminance level is within a low-luminance range or a high-luminance range or the like as a whole is determined. Then, the determination information S1 is output as a determination result.

As content of determination information S1, examples such as the following (content a) to (content d) or the like are considered:

(content a) information regarding whether or not a frame is a low-luminance frame;

(content b) determination information regarding a low-luminance frame/high-luminance frame;

(content c) determination information regarding low-luminance frame/intermediate-luminance frame/high-luminance frame; and (content d) information regarding whether or not a frame is high-luminance frame.

In addition, information indicating the whole black image and the whole white image is included in the (content a) to (content d) in some cases.

The low-luminance frame is, for example, a frame that has a frame luminance difference is less than a certain first predetermined value. The low-luminance frame is equivalent to a frame of a whole white image or a dark image close to a whole black image.

The high-luminance frame is, for example, a frame that has a frame luminance difference is equal to or greater than a certain second predetermined value. The high-luminance frame is equivalent to a frame of a whole white image or a bright image closes to the whole white image.

The first predetermined value and the second predetermined value are the same value or different values in some cases.

The frame luminance value is, for example, an integrated value, an average value, a dominant luminance value, or the like of luminance of all the pixels of a frame.

Note that when the determination is performed for each frame, an arithmetic processing load increases depending on a processing ability of the input signal determination unit 12. Accordingly, the luminance state may be determined at an interval of a plurality of frames.

The image signal Sin is supplied to the light valve control unit 13 while the input signal determination unit 12 performs the determination process.

The light valve control unit 13 generates a liquid crystal driving signal on the basis of the R signal in the image signal Sin, supplies the liquid crystal driving signal to the liquid crystal light valve 240R, and cause an R image to be generated on the liquid crystal light valve 240R.

In addition, the light valve control unit 13 generates a liquid crystal driving signal on the basis of the G signal in the image signal Sin, supplies the liquid crystal driving signal to the liquid crystal light valve 240G and causes a G image to be generated on the liquid crystal light valve 240G.

Further, the light valve control unit 13 generates a liquid crystal driving signal on the basis of the B signal in the image signal Sin, supplies the liquid crystal driving signal to the liquid crystal light valve 240B, and causes a B image to be generated on the liquid crystal light valve 240B.

In this way, by driving the liquid crystal light valves 240R, 240G and 240B, the red light R3, the green light G3, and the blue light B3 are modulated in the image generation unit 200 to generate a red image, a green image, and a blue image.

On the other hand, the red light R3, the green light G3, and the blue light B3 in the image generation unit 200 are generated by the light source device 100. The solid-state light source control unit 14 performs various kinds of control on the light source device 100. The solid-state light source control unit 14 includes, for example, a microcomputer.

When an image is projected by the projector device 400, the solid-state light source control unit 14 instructs the light source current control unit 15 to drive the laser light source 131. In response to this instruction, the light source current control unit 15 supplies a current so that the laser light source 131 can be caused to perform a light emission operation in the light source device 100.

In addition, the solid-state light source control unit 14 instructs the electric heating coil control unit 16, the fan control unit 17, and the heatsink control unit 18 to perform necessary operations. In particular, the solid-state light source control unit 14 performs an operation instruction on the basis of the determination information S1 which is a determination result of a luminance state of the input signal determination unit 12.

The electric heating coil control unit 16 turns on/off electrification of the electric heating coils 190. That is, the electric heating coil control unit 16 turns on/off a heating operation by the electric heating coils 190 on the laser light source 131 in response to an instruction from the solid-state light source control unit 14.

The fan control unit 17 turns on/off driving of the intake fan 51 and the exhaust fan 52. That is, the fan control unit 17 turns on/off a cooling operation by the intake fan 51 and the exhaust fan 52 on the laser light source 131 in response to an instruction from the solid-state light source control unit 14.

Note that an example in which the fan control unit 17 simultaneously turns on/off the intake fan 51 and the exhaust fan 52 will be described, but the fan control unit 17 may individually turn on/off the intake fan 51 and the exhaust fan 52.

In addition, only one of the intake fan 51 and the exhaust fan 52 is disposed in some cases.

The heatsink control unit 18 drives a driving mechanism (motor) of the heatsink driving unit 41 to displace the heatsink 40 between the contact state and the separate state with respect to the light source device 100.

When the heatsink 40 is in the contact state to the light source device 100, a heat exhaust function is appropriately performed. When the heatsink 40 is considered to be in the separate state, the heat exhaust function disappears (or is weakened). That is, the heatsink driving unit 41 adjusts a heat exhaust effect by the heatsink 40 with respect to the laser light source 131 in response to an instruction from the solid-state light source control unit 14.

Here, a background in which the temperature adjustment device that heats or cools the laser light source 131 in the embodiment is provided will be described.

In the projector device 400, of course, high quality of a projected video is preferable and an improvement in a contrast ratio is preferable as one example.

The contrast ratio is decided in accordance with performance of a light source and an optical system and is also influenced by an operation state of the solid-state light source.

Figure 6:
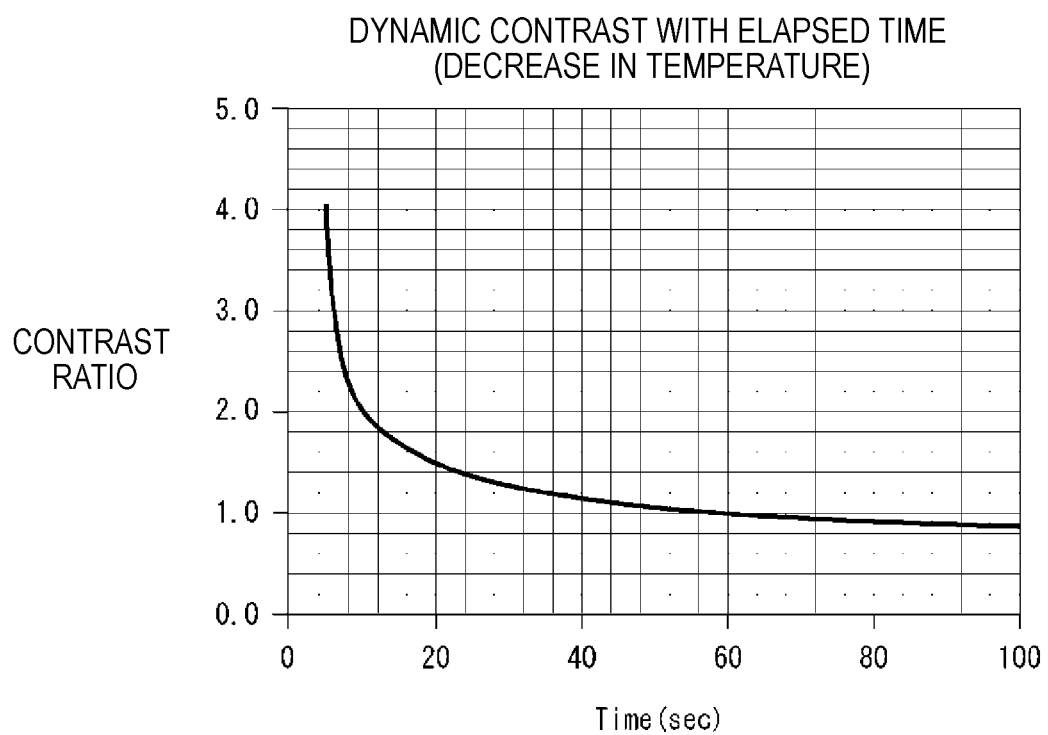
FIG. 6 is an explanatory diagram illustrating lowering of a dynamic contrast over time.

FIG. 6 illustrates a form in which dynamic contrast is lowered with an elapsed time.

For example, at the time of dimming of a light source (lowering of a current supplied to the solid-state light source) when a whole black signal is input, a temperature of the solid-state light source decreases over time. When the temperature of the solid-state light source decreases, light emission efficiency of the solid-state light source increases. That is, when the temperature of the solid-state light source is lowered, the light emission efficiency continues to increase, and thus display luminance may be raised over time.

Therefore, a contrast ratio which has first been relatively high may be lowered with an elapsed time as in FIG. 6.

Incidentally, a further improvement in the contrast ratio can be realized in accordance with an operation environment in consideration of the fact that the light emission efficiency of the solid-state light source is influenced by a temperature in this way.

For example, in the case of a black image, the light emission efficiency is caused to be lowered by increasing the temperature. In addition, in the case of a white image, the light emission efficiency is caused to increase by decreasing the temperature. Then, the black image can be set to have lower luminance and the white image can be set to have higher luminance.

That is, for example, when an operation of decreasing the light emission efficiency by increasing the temperature of the solid-state light source at the time of inputting of a whole black image signal, it is possible to drop black luminance and realize an improvement in the contrast ratio.

In addition, for example, when an operation of increasing the light emission efficiency by decreasing the temperature of the solid-state light source at the time of inputting of a whole white image signal, it is possible to raise white luminance to realize an improvement in the contrast ratio.

Accordingly, in the embodiment, the temperature of the solid-state light source (the laser light source 131) is adjusted in accordance with the determination result of the luminance state of the display image.

Therefore, an operation example of the temperature adjustment device will be described.

FIG. 7A illustrates a case in which the electric heating coil 190 is not provided and FIG. 7B illustrates a case in which the electric heating coil 190 is provided.

Note that the drawing schematically illustrates the laser light source array AR is in direct contact with the heatsink 40. However, actually, the mounting substrate 141 on which the laser light source array AR is disposed is in direct contact with the heatsink 40 or is in indirect contact with the heatsink 40 via a certain portion (the same applies to FIGS. 8 and 9).

In a case in which the electric heating coil 190 is not provided as in FIG. 7A, heat generated by the laser light source array AR is transmitted to the heatsink 40 (as indicated by dotted-line arrows) while being dissipated to a surrounding space (as indicated by solid-line arrows), and thus the heat is efficiently dissipated from the heatsink 40. Accordingly, in particular, in a case in which laser emission of low luminance is performed by light source dimming or the like, a decrease in temperature also occurs.

For example, by disposing the electric heating coil 190 around the laser light source array AR as in FIG. 7B and electrifying the electric heating coil 190, the laser light source array AR can be heated (as indicated by dotted-line arrows).

Figure 8:
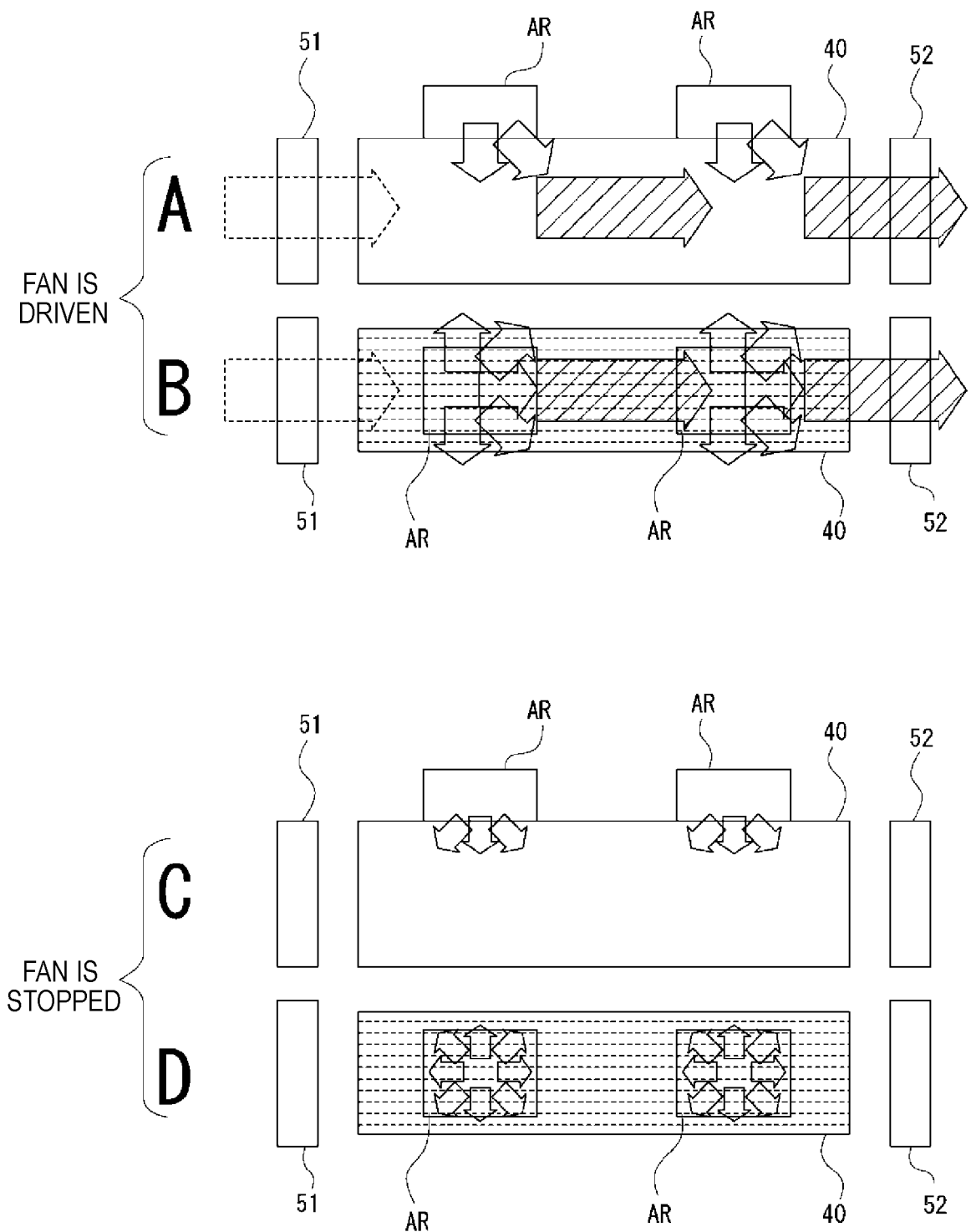
FIG. 8 is an explanatory diagram illustrating temperature adjustment by a fan according to an embodiment.

FIG. 8 illustrates a form of cooling by the intake fan 51 and the exhaust fan 52.

FIGS. 8A and 8B illustrate a state in which the intake fan 51 and the exhaust fan 52 are driven from the side surface side and the upper surface side of the heatsink 40.

Heat is transmitted from the laser light source arrays AR to the heatsink 40 (ad indicated by solid-line arrows). At this time, air blown from the intake fan 51 (as indicated by dotted-line arrows) flow to an uneven space of the heatsink 40 and is exhausted by the exhaust fan 52 (as indicated by arrows with oblique lines). That is, the laser light source arrays AR are cooled by efficient heat dissipation by the heatsink 40.

On the other hand, FIGS. 8C and 8D illustrate a state in which the intake fan 51 and the exhaust fan 52 are stopped from the side surface side and the upper surface side of the heatsink 40.

For the heat (as indicated by solid-line arrows) transmitted from the laser light source arrays AR to the heatsink 40, no air is blown from the intake fan 51 to the exhaust fan 52. Therefore, the heat is easily confined in the heatsink 40 and a cooling ability is lowered.

Figure 9:
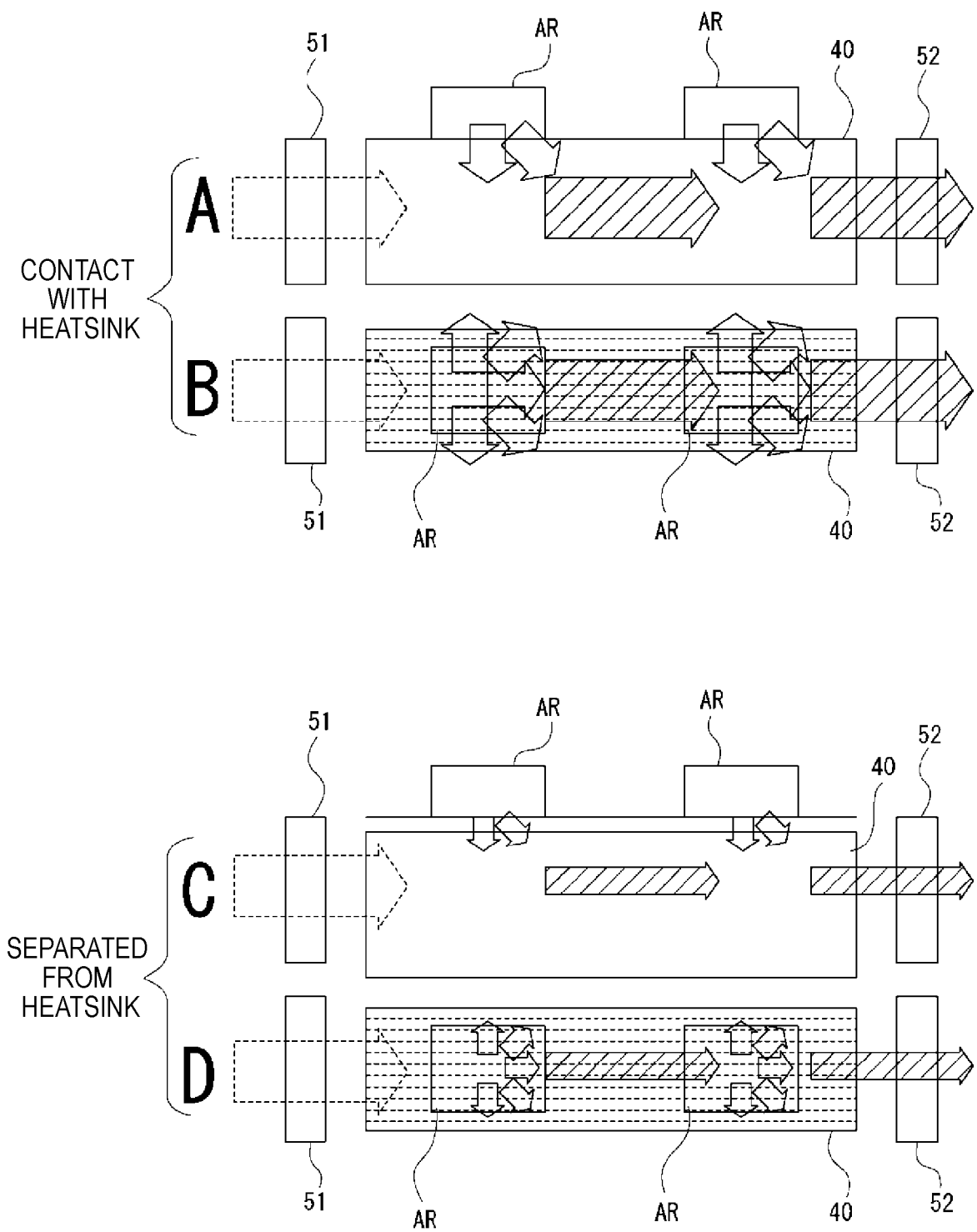
FIG. 9 is an explanatory diagram illustrating temperature adjustment by heatsink disjunction according to an embodiment.

FIG. 9 illustrates a form of temperature adjustment by contact/separation of the heatsink 40. Note that the intake fan 51 and the exhaust fan 52 are assumed to be driven.

FIGS. 9A and 9B illustrates a state in which the laser light source arrays AR are in direct or indirect contact with the heatsink 40 and heat generated by the laser light source arrays AR are efficiently transmitted to the heatsink 40 (as indicated by solid-line arrows) from the side surface side and the upper surface side of the heatsink 40.

At this time, the laser light source arrays AR are cooled by efficient heat dissipation by the heatsink 40 in which the air blown from the intake fan 51 (as indicated by dotted-line arrows) flows to the uneven space of the heatsink 40 and is exhausted by the exhaust fan 52 (as indicated by arrows with oblique lines).

On the other hand, FIGS. 9C and 9D illustrate a state in which the heatsink 40 is separated from the side surface side and the upper surface side of the heatsink 40. The heat generated by the laser light source arrays AR is rarely transmitted to the heatsink 40 (as indicated by solid-line arrows). Accordingly, although air blown from the intake fan 51 (as indicated by dotted-line arrows) flows to the uneven space of the heatsink 40 and is exhausted by the exhaust fan 52 (as indicated by arrows with oblique lines), the dissipated heat is small and a cooling function from the laser light source arrays AR is lowered.

In the embodiment, control is performed to improve a contrast ratio using the temperature adjustment device. Therefore, for example, the solid-state light source control unit 14 performs a process of FIG. 10.

Figure 10:
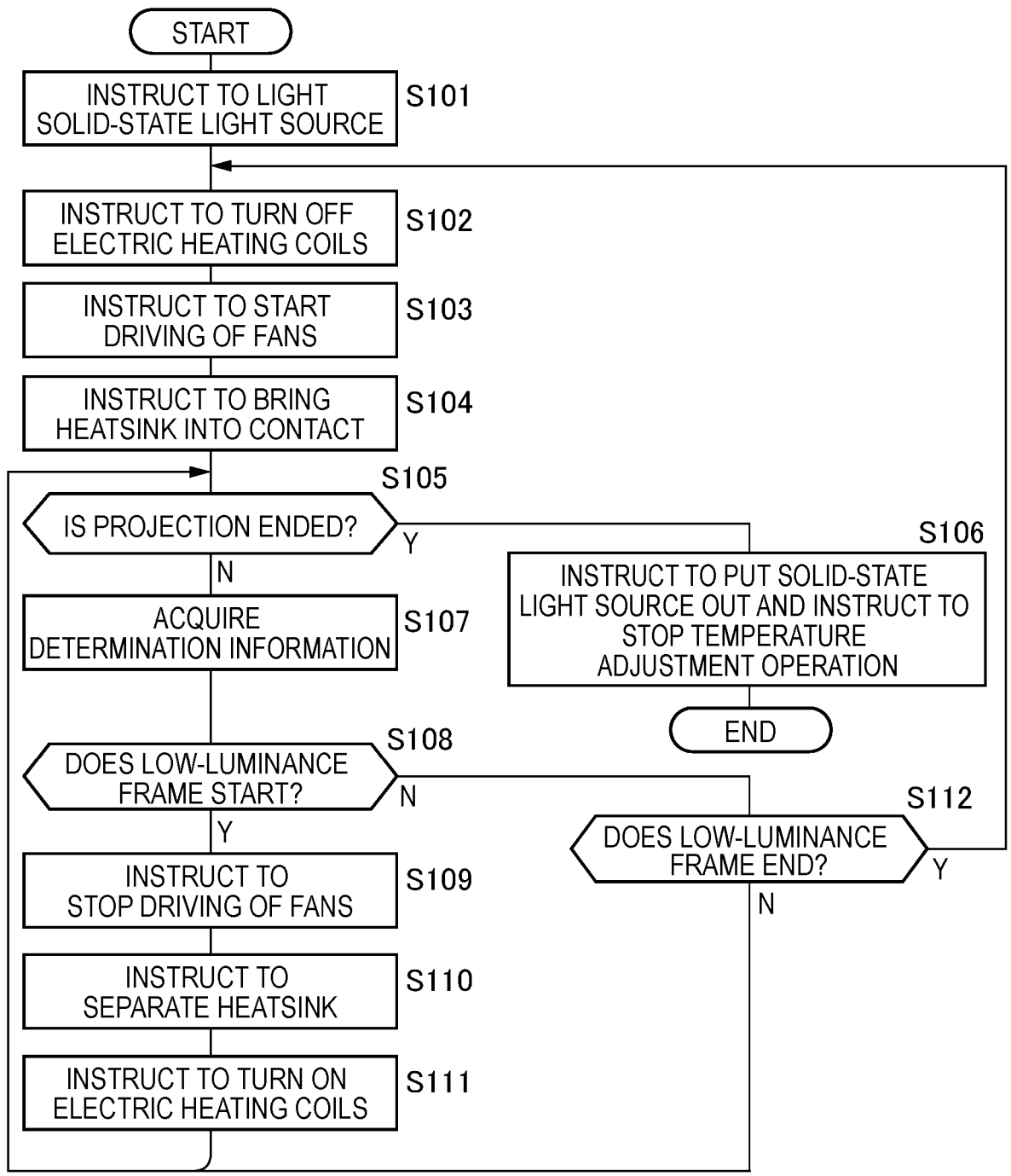
FIG. 10 is a flowchart illustrating a control process according to the first embodiment.

FIG. 10 illustrates a process example of a case in which an image is projected by the projector device 400. For example, the projector device 400 starts projecting an image through a user manipulation, control from an external device, or the like. The image to be projected is an image based on the image signal Sin. As the image signal Sin, there is a moving image, a still image, a whole white image, a whole black image, or the like as various kinds of image content, presentation images, or the like.

In a case in which projection of the image is started, the solid-state light source control unit 14 gives an instruction to light the solid-state light source in step S101. That is, the light source current control unit 15 is instructed to start light emission of the laser light source 131.

In the example of FIG. 10, cooling is performed generally to suppress an increase in a temperature so that the light emission efficiency of the laser light source 131 is not lowered.

Therefore, in step S102, the solid-state light source control unit 14 instructs the electric heating coil control unit 16 to turn off the electric heating coils 190 (or does not instruct the electric heating coil control unit 16 to turn on the electric heating coils 190).

In addition, in step S103, the solid-state light source control unit 14 gives an instruction to drive the fans to the fan control unit 17 so that the intake fan 51 and the exhaust fan 52 are driven.

In addition, in step S104, the solid-state light source control unit 14 gives an instruction to the heatsink driving unit 41 so that the heatsink driving unit 41 brings the heatsink 40 into contact with the light source device 100. That is, the solid-state light source control unit 14 sets a state in which the heat exhaust function by the heatsink 40 is effectively performed. Note that a contact state of the heatsink 40 may be checked at this time point.

Through the foregoing control, the projector device 400 enters a state in which an image is projected while cooling the laser light source 131. That is, light projected from the projection unit 300 is emitted on the basis of light from the laser light source 131. In this case, the liquid crystal light valves 240R, 240G, and 240B form a color image on a screen to which the projected light is radiated since images are formed with liquid crystal driving signals from the light valve control unit 13.

In step S105, the solid-state light source control unit 14 checks an instruction to end the projection, that is, to end the projection of the images.

The process proceeds to step S107 while the projection continues. The solid-state light source control unit 14 acquires the determination information S1 from the input signal determination unit 12 in step S107. Then, in step S108, whether or not a low-luminance frame starts is determined with the determination information S1.

For example, the determination information S1 is generated for each frame or intermittent frame of the input image signal Sin by the input signal determination unit 12. The solid-state light source control unit 14 normally monitors acquisition of the determination information S1 and starting of the low-luminance frame in steps S107 and S108 after the projection of the images starts.

Then, the solid-state light source control unit 14 monitors a timing at which the determination of the low-luminance frame starts from the determination information S1 acquired for each frame timing or a certain frame timing in step S108. For example, it is determined that the image is not the low-luminance frame in the previous determination information S1, but it is determined whether or not the current determination information S1 is changed in the determination of the low-luminance frame.

Note that in a case in which the determination information S1 is generated in an intermittent frame, a start timing of the low-luminance frame (a start frame) may not be determined necessarily accurately. However, there is no problem since the start timing is not strictly accurately requested.

Except for the timing at which the low-luminance frame is determined to start, the process proceeds from step S108 to S112 and the solid-state light source control unit 14 checks whether or not the low-luminance frame ends from the acquired determination information S1. At the timing at which the low-luminance frame ends, the process proceeds to step S102. In other cases, the process proceeds to step S105.

Accordingly, during a period from the projection start of the image to the determination in which the image becomes the low-luminance frame, steps proceed to step S107→step S108→step S112→step S105 and the state of the cooling function of the temperature adjustment device (the electric heating coils are turned off, the fans are driven, and the heatsink comes into contact) is maintained.

When the start of the low-luminance frame is checked, the process proceeds from step S108 to step S109 and the solid-state light source control unit 14 causes the temperature adjustment device to perform the heating function (including OFF of the cooling function).

In step S109, the solid-state light source control unit 14 instructs the fan control unit 17 to stop the driving of the fans so that the intake fan 51 and the exhaust fan 52 are stopped.

In addition, in step S110, the solid-state light source control unit 14 instructs the heatsink driving unit 41 to set a separation state so that the heatsink driving unit 41 separates the heatsink 40 from the light source device 100. That is, the heat exhaust function by the heatsink 40 is caused to be turned off or lowered.

In addition, in step S111, the solid-state light source control unit 14 instructs the electric heating coil control unit 16 to turn on the electric heating coils 190.

In this way, the heating (including stop of cooling) is controlled and the process returns to step S105.

During a period in which the low-luminance frame continues after the image becomes a low-luminance frame, that is, a period in which the state in which the determination information S1 acquired in step S107 indicates the low-luminance frame continues, the process of the solid-state light source control unit 14 proceeds to step S107→step S108→step S112→step S105 and the state of the heating function of the temperature adjustment device (the electric heating coils are turned on, the fans are stopped, and the heatsink is separated) is maintained.

In addition, when the low-luminance frame ends in the image signal Sin, the process of the solid-state light source control unit 14 proceeds to step S107→step S108→step S112→step S102. In this case, the solid-state light source control unit 14 switches the temperature adjustment device to the state of the cooling function (the electric heating coils are turned off, the fans are driven, and the heatsink comes into contact) in steps S102, S103, and S104.

Note that in the case of the process example of FIG. 10, content of the determination information S1 may be one of the above-described (content a), (content b), and (content c) and a determination result obtained by determining whether or not the image is not the low-luminance frame may be included to determine steps S108 and S112.

In response to a user manipulation, an instruction from an external device, non-input of the image signal Sin, or the like, the projection of the image ends.

When the projection ends, the process of the solid-state light source control unit 14 proceeds from step S105 to step S106 and a process of ending the projection is performed. That is, the solid-state light source control unit 14 instructs the light source current control unit 15 to put the solid-state light source out so that the light emitted by the laser light source 131 is caused to stop.

In addition, the solid-state light source control unit 14 gives an instruction to stop a temperature adjustment operation. Here, in particular, a device that turns on an operation for cooling or heating is turned off. That is, the solid-state light source control unit 14 instructs the electric heating coil control unit 16 to turn off the electric heating coils 190. In addition, the fan control unit 17 is instructed to stop the driving of the fans so that the intake fan 51 and the exhaust fan 52 are caused to stop.

It does not particularly matter to the heatsink 40 in the contact state and the separate state, but the solid-state light source control unit 14 may instruct the heatsink control unit 18 to return to the initial state. The initial state may be set to the contact state or may be set to the separate state.

By performing the foregoing process of FIG. 10, the heating function for the laser light source 131 is performed during the projection of the low-luminance image. Accordingly, the light emission efficiency of the laser light source 131 can be lowered and the luminance of the image can be further darkened.

On the other hand, the cooling function for the laser light source 131 is performed during the projection of an image which is not the low-luminance image. Accordingly, the light emission efficiency of the laser light source 131 can increase, the luminance of the image can be heightened, and thus a bright image can be projected.

Note that "heating" of the heating function includes not only applying heat actively but also turning off (or lowering) the cooling function such as stopping the intake fan 51 and the exhaust fan 52 or separating the heatsink 40 as in the electric heating coils 190.

Similarly, "cooling" of the cooling function include not only performing heat exhaust or the like actively such as driving the intake fan 51 and the exhaust fan 52 or coming into contact with the heatsink 40 but also performing no heating such as turning off the electric heating coils 190.

In the examples of FIGS. 5 and 10, the electric heating coils 190, the fans (the intake fan 51 and the exhaust fan 52), and the heatsink 40 serving as a temperature adjustment device that performs the heating or cooling have been given as three example but only one or two thereof can also be considered to be used.

Steps S102, S103, and S104 or steps S109, S110, and S111 of FIG. 10 may be performed in accordance with kinds of mounted temperature adjustment devices.

In addition, in the start determination of the low-luminance frame of step S108 and the end determination of the low-luminance frame of step S112, it is actually preferable to exclude the change in the determination information S1 in a case in which the image has high luminance only instantaneously or becomes a low-luminance frame only instantaneously. This is because it is proper to detect a situation in which a low-luminance frame or a high-luminance frame continues to some extent and perform temperature adjustment.

3. Second Embodiment

A second embodiment will be described with reference to FIG. 11. Note that the same reference numerals are given to the same portions as those of FIG. 5 and the description thereof will be omitted.

Figure 11:
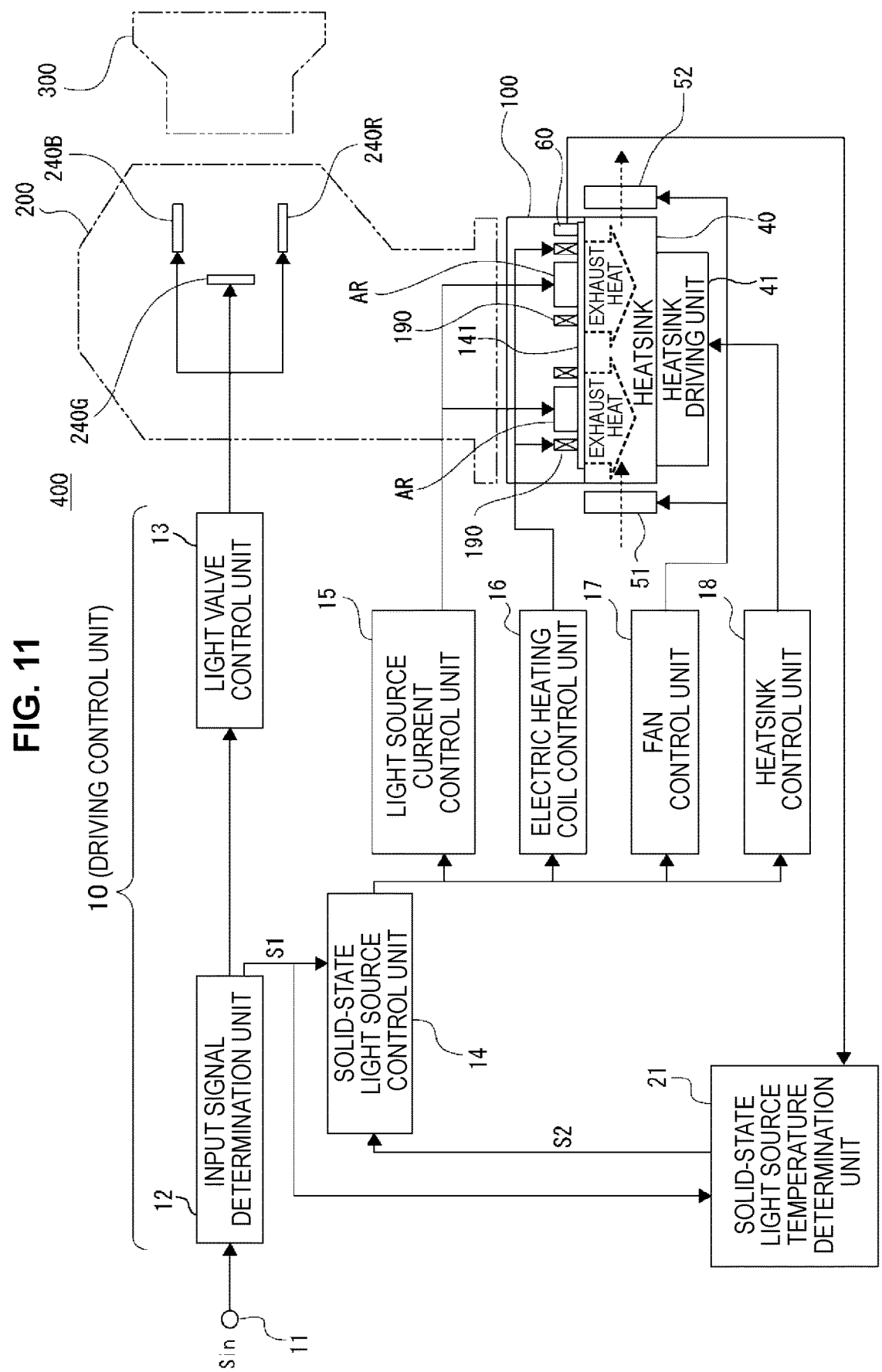
FIG. 11 is a block diagram illustrating a control configuration according to a second embodiment.

In a configuration example of FIG. 11, the temperature sensor 60 is provided near the laser light source array AR on the mounting substrate 141.

In addition, a solid-state light source temperature determination unit 21 is provided. The solid-state light source temperature determination unit 21 inputs a detection value of the temperature sensor 60 and determines whether or not a current temperature of the laser light source array AR is appropriate (whether or not it is necessary to adjust the temperature by heating or cooling). Then, determination information S2 for adjustment necessity and unnecessity is supplied to the solid-state light source control unit 14.

In particular, the solid-state light source temperature determination unit 21 checks a luminance state of a current frame in accordance with the determination information S1 and determines whether or not a temperature state is appropriate in accordance with the luminance state.

Figure 12:
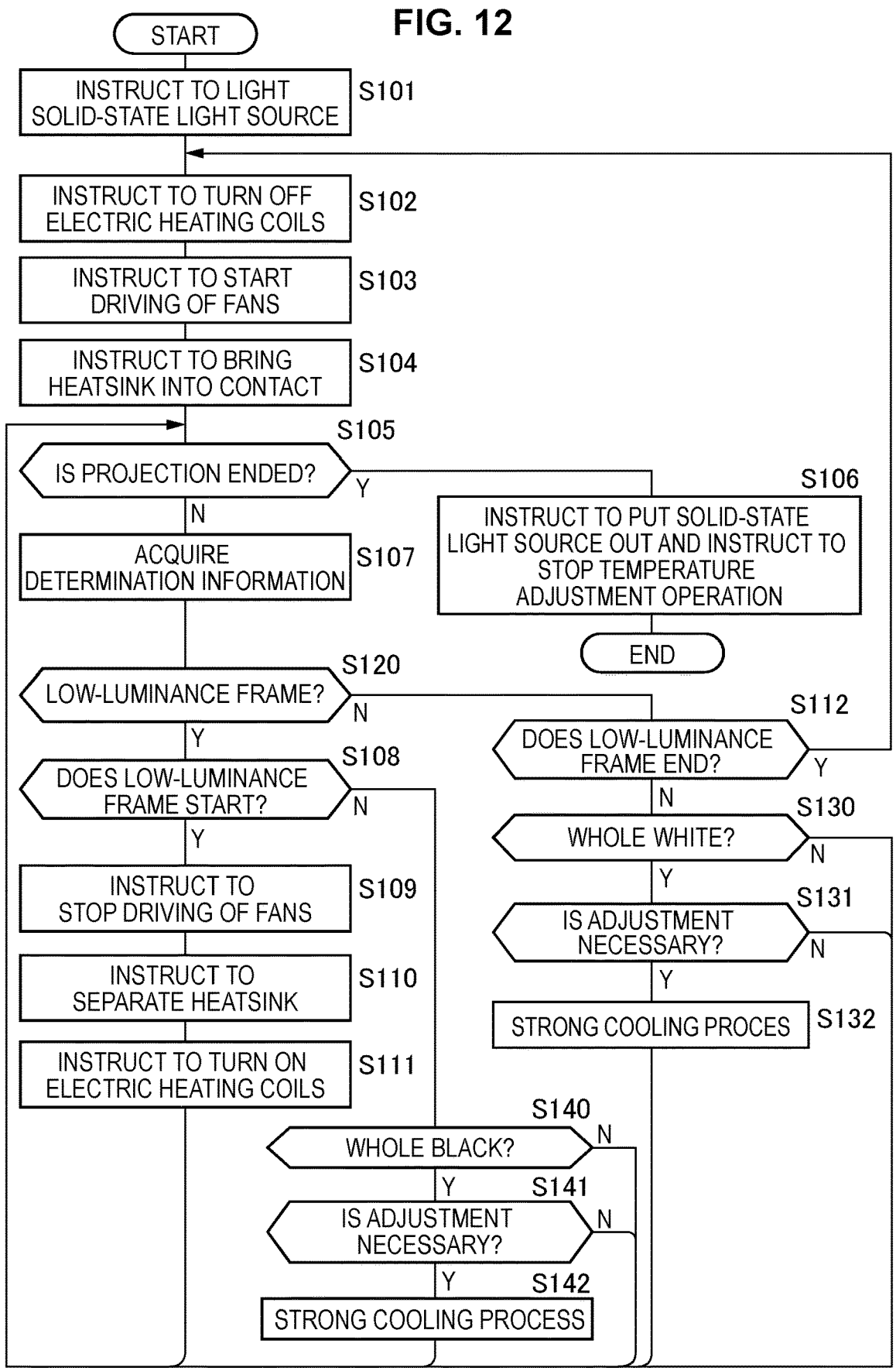
FIG. 12 is a flowchart illustrating a control process according to second, third, and fourth embodiments.

FIG. 12 illustrates a process example of a case in which the temperature sensor 60 and the solid-state light source temperature determination unit 21 are included.

Note that in the case of the process example of FIG. 12, the content of the determination information S1 is assumed to be one of the above-described (content a), (content b), and (content c) and is assumed to include a determination result indicating whether or not a frame is a low-luminance frame and include information indicating a whole black image or a whole white image.

In FIG. 12, the same step numerals are given to the same processes as those of FIG. 10 and the description thereof will be avoided.

The processes of steps S101 to S107 from a start time point of image projection are the same as those of FIG. 10.

After the image projection starts, the solid-state light source control unit 14 checks in step S120 whether or not a current frame (a frame related to the determination information S1 acquired in step S107) is a low-luminance frame.

In a case in which the frame is the low-luminance frame, it is checked in step S108 whether or not the current fame is a start frame of the low-luminance frame.

Then, when it is determined that a start timing of the low-luminance frame comes, the solid-state light source control unit 14 causes the temperature adjustment device to perform the heating function in steps S109, S110, and S111.

During a period in which it is determined that the frame is the low-luminance frame in the determination information S1 continues, it is determined in step S120 that the frame is the low-luminance frame and it is determined in step S108 that a start timing of the low-luminance frame does not come. Then, the process proceeds to step S140. That is, a whole black image or a dark image close to the whole black image is displayed as a projected image in this case.

In step S140, the solid-state light source control unit 14 branches the process depending on whether or not the current frame is a whole black image. Whether or not the current frame is the whole black image may be checked with reference to the determination information S1.

In the case of the whole black image, the solid-state light source control unit 14 checks in step S141 whether or not temperature adjustment is necessary. Here, the determination information S2 from the solid-state light source temperature determination unit 21 is checked.

The solid-state light source temperature determination unit 21 maintains a temperature in an appropriate overheating state of the laser light source array AR in the case of the whole black image as a target heating temperature. When the whole black image is currently detected in accordance with the determination information S1, whether or not the temperature of the current laser light source array AR reaches the target heating temperature is determined in accordance with a detection value of the temperature sensor 60. Then, the solid-state light source temperature determination unit 21 supplies the determination result (indicating whether or not the temperature reaches the target heating temperature) as the determination information S2 to the solid-state light source control unit 14.

Accordingly, when the determination information S2 is information such as "adjustment necessity," the process proceeds from step S141 to step S142 and the solid-state light source control unit 14 performs a strong heating process. For example, only during a predetermined time, the electric heating coil control unit 16 is caused to increase a current amount of coil electrification and gives an instruction to increase a heating amount.

When the determination information S2 is information such as "adjustment unnecessity," the process does not proceed to step S142 and the solid-state light source control unit 14 does not perform the strong heating process.

Therefore, when the temperature does not reach the target heating temperature at the time of projection of the whole black image, the strong heating process is performed so that the laser light source array AR reaches the target heating temperature. Accordingly, the light emission efficiency of the laser light source 131 is appropriately lowered in accordance with the whole black image.

In a case in which the determination information S1 acquired in step S107 indicates that the frame is not the low-luminance frame, the process of the solid-state light source control unit 14 proceeds from step S120 to step S112 and it is first determined whether or not an end timing of the low-luminance frame comes.

Then, when the low-luminance frame continuing in the image signal Sin ends, the process of the solid-state light source control unit 14 proceeds to step S107→step S120→step S112→step S102. In this case, the solid-state light source control unit 14 performs control of a direction in which the light emission efficiency of the laser light source 131 increases by switching the temperature adjustment device to the state of the cooling function (the electric heating coils are turned off, the fans are driven, and the heatsink comes into contact) in steps S102, S103, and S104.

In a case in which the determination information S1 acquired in step S107 indicates that the frame is not the low-luminance frame and the end timing of the low-luminance frame does not come, that is, during a period in which an image with no low-luminance continues, the process proceeds to from step S112 to step S130.

In step S130, the solid-state light source control unit 14 branches the process depending on whether or not the current frame is a whole white image. Whether or not the current frame is the whole white image may be checked with reference to the determination information S1.

In the case of the whole white image, the solid-state light source control unit 14 checks in step S131 whether or not temperature adjustment is necessary. Here, the determination information S2 from the solid-state light source temperature determination unit 21 is checked.

The solid-state light source temperature determination unit 21 maintains a temperature in an appropriate cooling state of the laser light source array AR in the case of the whole white image as a target cooling temperature. When the whole white image is currently detected in accordance with the determination information S1, whether or not the temperature of the current laser light source array AR reaches the target cooling temperature is determined in accordance with a detection value of the temperature sensor 60. Then, the solid-state light source temperature determination unit 21 supplies the determination result (indicating whether or not the temperature reaches the target cooling temperature) as the determination information S2 to the solid-state light source control unit 14.

Accordingly, when the determination information S2 is information such as "adjustment necessity," the process proceeds from step S131 to step S132 and the solid-state light source control unit 14 performs a strong cooling process. For example, only during a predetermined time, the fan control unit 17 is instructed to increase the number of rotations of the intake fan 51 and the exhaust fan 52 to increase an amount of blown air.

When the determination information S2 is information such as "adjustment unnecessity," the process does not proceed to step S132 and the solid-state light source control unit 14 does not perform the strong cooling process.

Therefore, when the temperature does not reach the target heating temperature at the time of projection of the whole white image, the strong cooling process is performed so that the laser light source array AR reaches the target cooling temperature. Accordingly, the light emission efficiency of the laser light source 131 can be caused to appropriately increase in accordance with the whole white image.

In a case in which end of the image projection (projection end) is considered in step S105, a process of ending the projection is performed in step S106. This process is similar to that of FIG. 10.

Through the foregoing processes of FIG. 12, the heating control is performed in the case of the low-luminance image and the cooling control is performed in the other cases as in FIG. 10. However, particularly in the case of the whole black image, the heating is promoted up to the target heating temperature. In the case of the whole white image, the cooling is promoted up to the target cooling temperature. Thus, it is possible to further lower the luminance of the whole black image and further raise the luminance of the whole white image.

Note that the adjustment determination may be performed in the case of a low-luminance image as well as a whole black image or a whole white image. That is, during a period in which the low-luminance frame continues, a reinforcement heating process may be performed as necessary so that the temperature becomes the target heating temperature of the low-luminance frame by excluding the process of step S140. Further, in a case in which the temperature is too high by heating depending on a circumstance, cooling may be performed.

In addition, during a period in which an image is not a low-luminance image, the adjustment determination may also be performed irrespective of whether or not an image is a whole white image. That is, a strong cooling process may be performed as necessary depending on whether or not the temperature reaches the target cooling temperature by excluding the process of step S130.

4. Third and Fourth Embodiments

Figure 13:
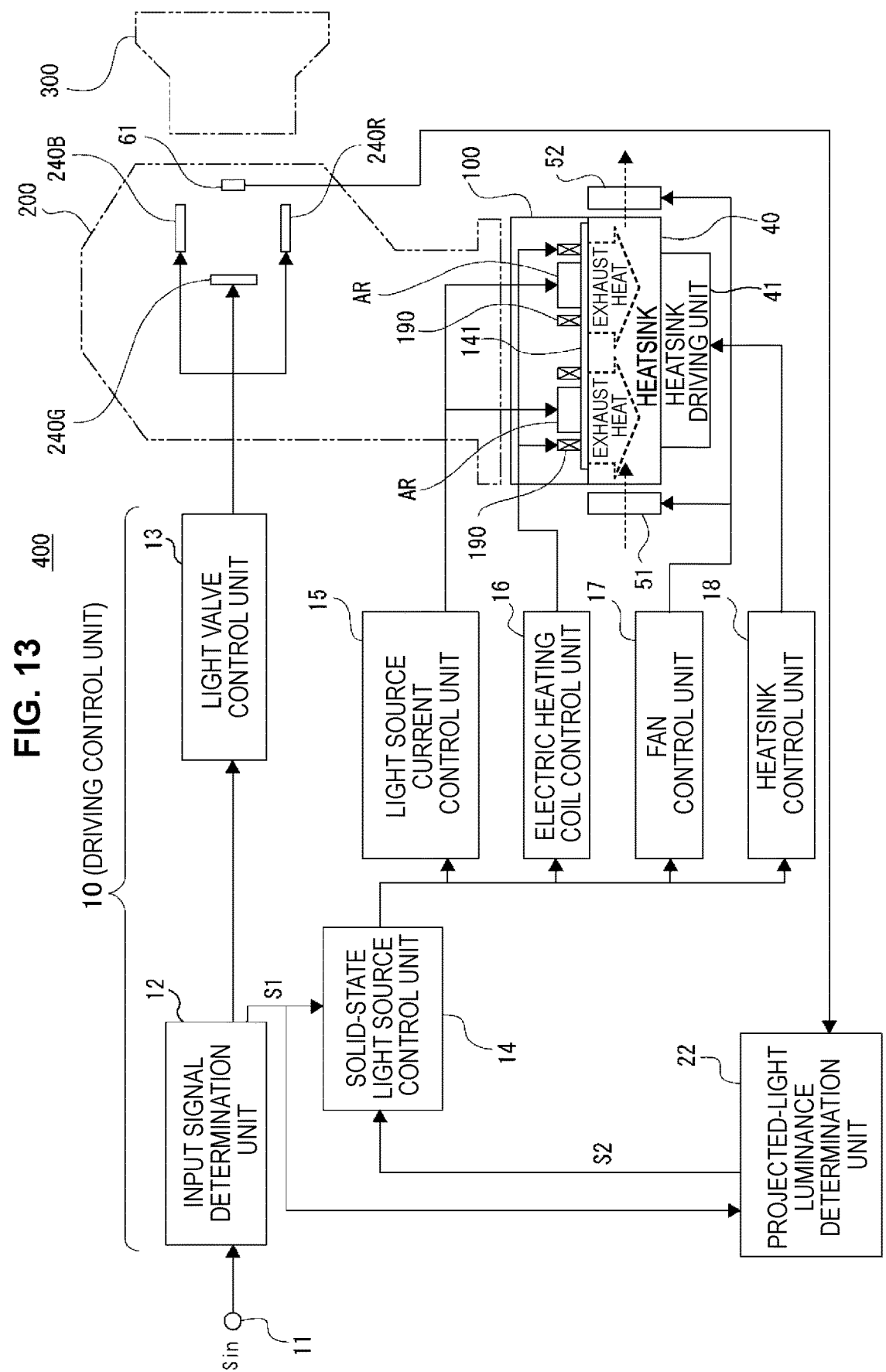
FIG. 13 is a block diagram illustrating a control configuration according to the third embodiment.

A configuration example of a third embodiment is illustrated in FIG. 13.

In the configuration example of FIG. 13, for example, a luminance sensor 61 that detects luminance of projected light is disposed in the image generation unit 200. The projected light mentioned herein is image light that passes through the liquid crystal light valves 240R, 240G and 240B and is combined.

Note that the luminance sensor 61 may be provided in the projection unit 300.

In addition, a projected-light luminance determination unit 22 is provided. The projected-light luminance determination unit 22 inputs a detection value of the luminance sensor 61 and determines whether or not current luminance of the projected light is appropriate (whether or not temperature adjustment by heating or cooling is necessary). Then, the determination information S2 for adjustment necessity and unnecessity is supplied to the solid-state light source control unit 14. In particular, the projected-light luminance determination unit 22 checks a luminance state of a current frame in accordance with the determination information S1 to determine whether or not the projected light is in an appropriate luminance state in accordance with the luminance state of the current frame.

As a process example of the case of this configuration, the above-described process of FIG. 12 can be adopted. That is, in the case of a whole black image, whether or not adjustment is necessary is determined in step S141 in accordance with the determination information S2. When the adjustment is necessary, the strong heating process is performed in step S142.

The projected-light luminance determination unit 22 maintains a target low-luminance value of the projected light in the case of the whole black image. Thus, when the whole black image is currently detected in accordance with the determination information S1, whether or not the current luminance of the projected light reaches the target low-luminance value is determined in accordance with the detection value of the luminance sensor 61. Then, the determination result is supplied as the determination information S2 to the solid-state light source control unit 14.

Accordingly, when the determination information S2 is information such as "adjustment necessity," the process proceeds from step S141 to step S142 and the solid-state light source control unit 14 performs the strong heating process.

In addition, in the case of a whole white image, whether or not the adjustment is necessary is determined in step S131 in accordance with the determination information S2. When the adjustment is necessary, the strong cooling process is performed in step S132.

The projected-light luminance determination unit 22 maintains a target high-luminance value of the projected light in the case of the whole white image. Thus, when the whole white image is currently detected in accordance with the determination information S1, whether or not the current luminance of the projected light reaches the target high-luminance value is determined in accordance with the detection value of the luminance sensor 61. Then, the determination result is supplied as the determination information S2 to the solid-state light source control unit 14.

Accordingly, when the determination information S2 is information such as "adjustment necessity," the process proceeds from step S131 to step S132 and the solid-state light source control unit 14 performs the strong heating process.

Figure 14:
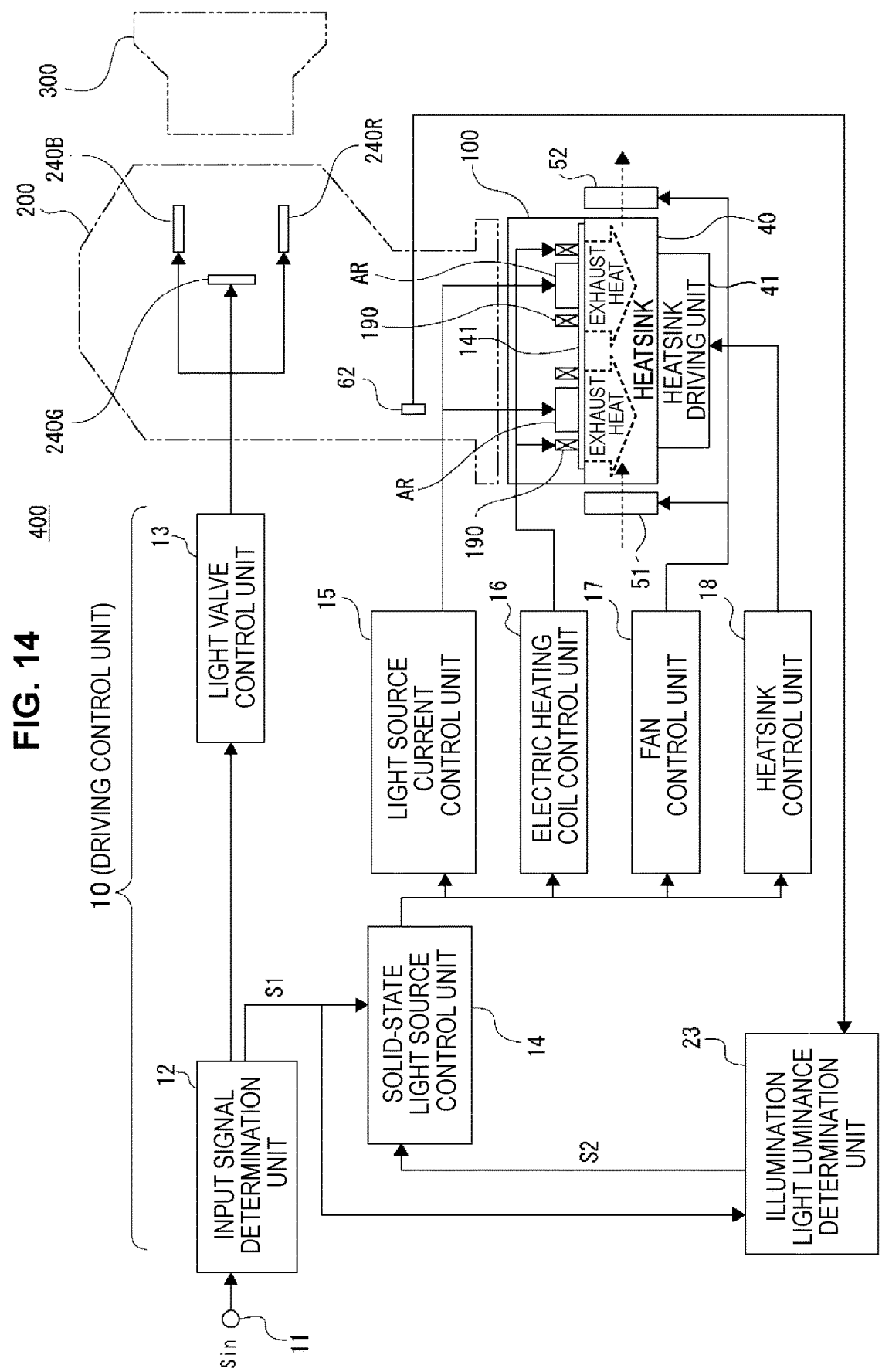
FIG. 14 is a block diagram illustrating a control configuration according to the fourth embodiment.

A configuration example of a fourth embodiment is illustrated in FIG. 14.

In the configuration example of FIG. 14, for example, a luminance sensor 62 that detects luminance of illumination light is disposed in the image generation unit 200. The illumination light mentioned herein is light before the light is incident on the liquid crystal light valves 240R, 240G, and 240B and is one of the red light R3, the green light G3, and the blue right B3 or combined light thereof.

In addition, an illumination light luminance determination unit 23 is provided. The illumination light luminance determination unit 23 inputs a detection value of the luminance sensor 62 and determines whether or not current luminance of the illumination light is appropriate (whether or not temperature adjustment by heating or cooling is necessary). Then, the determination information S2 for adjustment necessity and unnecessity is supplied to the solid-state light source control unit 14. In particular, the illumination light luminance determination unit 23 checks a luminance state of a current frame in accordance with the determination information S1 to determine whether or not the illumination light is in an appropriate luminance state in accordance with the luminance state of the current frame.

As a process example of the case of this configuration, the above-described process of FIG. 12 can also be adopted. That is, in the case of a whole black image, whether or not adjustment is necessary is determined in step S141 in accordance with the determination information S2. When the adjustment is necessary, the strong heating process is performed in step S142.

The illumination light luminance determination unit 23 maintains a target low-luminance value of the illumination light in the case of the whole black image. Thus, when the whole black image is currently detected in accordance with the determination information S1, whether or not the current luminance of the illumination light reaches the target low-luminance value is determined in accordance with the detection value of the luminance sensor 62. Then, the determination result is supplied as the determination information S2 to the solid-state light source control unit 14.

Accordingly, when the determination information S2 is information such as "adjustment necessity," the process proceeds from step S141 to step S142 and the solid-state light source control unit 14 performs the strong heating process.

In addition, in the case of a whole white image, whether or not the adjustment is necessary is determined in step S131 in accordance with the determination information S2. When the adjustment is necessary, the strong cooling process is performed in step S132.

The illumination light luminance determination unit 23 maintains a target high-luminance value of the illumination light in the case of the whole white image. Thus, when the whole white image is currently detected in accordance with the determination information S1, whether or not the current luminance of the illumination light reaches the target high-luminance value is determined in accordance with the detection value of the luminance sensor 62. Then, the determination result is supplied as the determination information S2 to the solid-state light source control unit 14.

Accordingly, when the determination information S2 is information such as "adjustment necessity," the process proceeds from step S131 to step S132 and the solid-state light source control unit 14 performs the strong heating process.

In the foregoing third and fourth embodiments, in the case of the whole black image, the heating is promoted until the target low-luminance value is obtained. In the case of the whole white image, the cooling is promoted until the target high-luminance value is obtained. Thus, it is possible to further lower the luminance of the whole black image and further raise the luminance of the whole white image.

5. Fifth Embodiment and Other Process Examples

In a fifth embodiment, an example in which a luminance state of an image is classified into a low-luminance image, an intermediate-luminance image, and a high-luminance image and a temperature adjustment device is caused to function in accordance with each case.

A process example of the solid-state light source control unit 14 will be described with reference to FIG. 15.

Note that the heatsink 40 is assumed to be fixed to the light source device 100 and performs a normal heat dissipation function.

Figure 15:
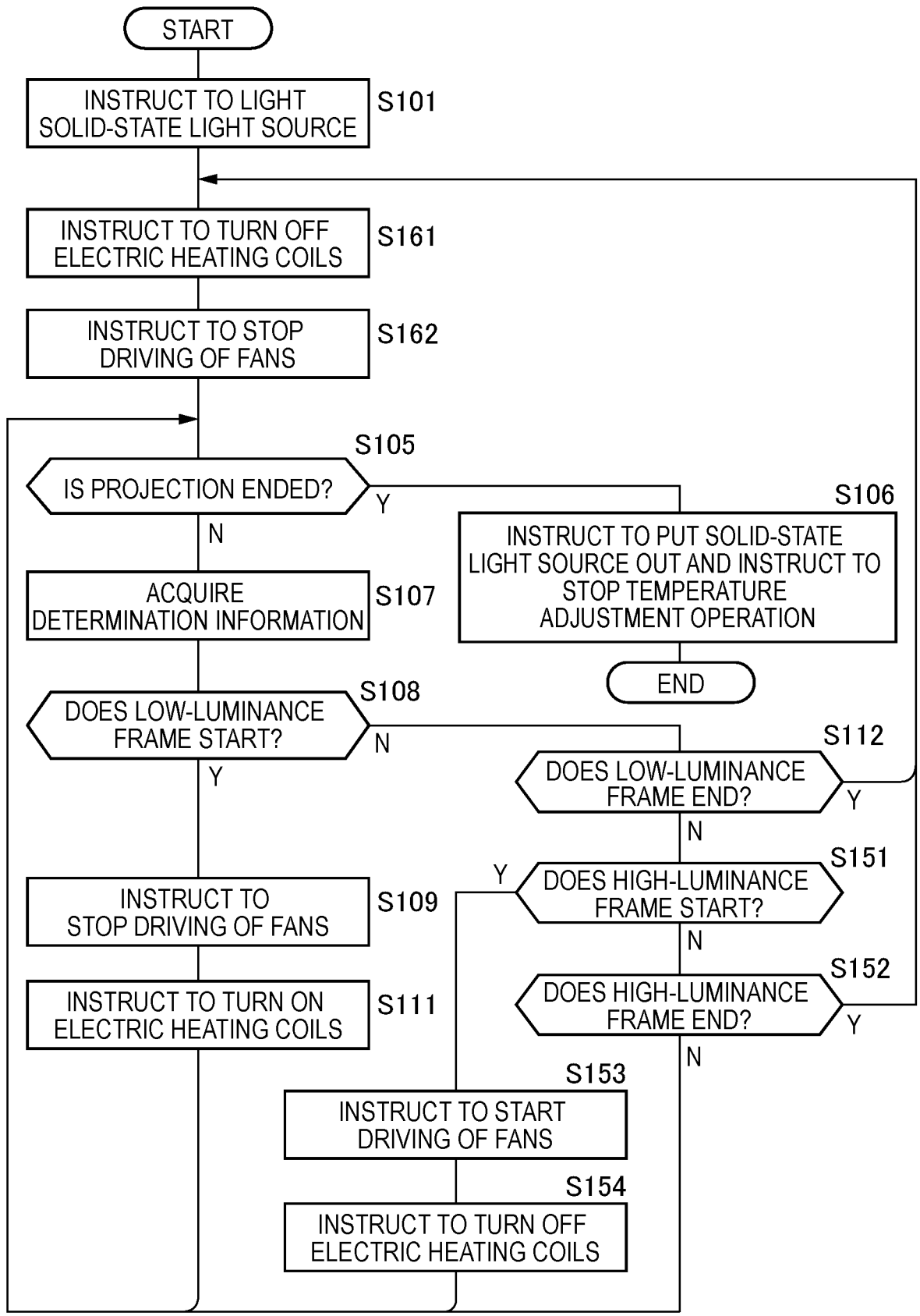
FIG. 15 is a block diagram illustrating a control process according to a fifth embodiment.

Then, in a process of FIG. 15, an example in which only the heatsink 40 is caused to function at the time of an intermediate-luminance image, the electric heating coil 190 is turned on at the time of a low-luminance image to perform heating, and an the intake fan 51 and the exhaust fan 52 are driven for cooling at the time of a high-luminance image is assumed.

Note that in the case of the process example of FIG. 15, content of the determination information S1 is assumed to be determination information of a low-luminance frame/intermediate-luminance frame/high-luminance frame as in the above-described (content c).

In FIG. 15, the same step numerals are given to the same steps as those of FIG. 10 and the description thereof will be avoided.

In response to start of image projection, the solid-state light source control unit 14 gives an instruction to light the solid-state light source in step S101. Then, in step S161, the solid-state light source control unit 14 instructs the electric heating coil control unit 16 to turn off the electric heating coils 190 (or does not give an instruction to turn on the electric heating coils 190).

In addition, in step S162, the solid-state light source control unit 14 instructs the fan control unit 17 to stop the driving of the fans (or does not give an instruction to drive the fans) so that the intake fan 51 and the exhaust fan 52 are caused to stop.

The end of the projection is monitored in step S105 and determination information is acquired in step S107, as in FIG. 10.

In step S108, the solid-state light source control unit 14 monitors a timing at which determination of a low-luminance frame starts from the determination information S1 acquired for a timing of each frame or a timing of several frames.

Except for the timing at which the determination of the low-luminance frame starts, the process proceeds from step S108 to step S112 and the solid-state light source control unit 14 checks whether or not the low-luminance frame ends from the acquired determination information S1. At the end timing of the low-luminance frame, the process proceeds to step S161. In the other cases, the process proceeds to step S151.

In step S151, the solid-state light source control unit 14 checks whether or not a timing is a start timing of a high-luminance frame. That is, it is checks whether or not the determination information S1 acquired in step S107 indicates that the current frame is the high-luminance frame.

Except for the timing at which the high-luminance frame is determined to start, the process proceeds from step S151 to S152 and the solid-state light source control unit 14 checks whether or not the high-luminance frame ends from the acquired determination information S1. At the timing at which the high-luminance frame ends, the process proceeds to step S161. In other cases, the process proceeds to step S105.

Accordingly, the following process is performed.

When the image is determined to be the low-luminance frame, the process proceeds from step S108 to steps S109 and S111 and the temperature adjustment device is caused to perform the heating function.

That is, in step S109, the solid-state light source control unit 14 instructs the fan control unit 17 to stop the driving of the fans so that the intake fan 51 and the exhaust fan 52 are caused to stop.

In addition, in step S111, the solid-state light source control unit 14 instructs the electric heating coil control unit 16 to turn on the electric heating coils 190. Then, the process returns to step S105.

During a period in which the low-luminance frame continues, the process proceeds to step S107→step S108→step S112→step S151→step S152→step S105 and the state of the heating function of the temperature adjustment device (the electric heating coils are turned on and the driving of the fans is stopped) is maintained.

When the low-luminance frame ends, the process proceeds to step S107→step S108→step S112→step S161 and the state of the heating function of the temperature adjustment device (the electric heating coils are turned on and the driving of the fans is stopped) is caused to end. That is, in this case, in step S161, the electric heating coil control unit 16 is instructed to turn off the electric heating coils 190. To stop the intake fan 51 and the exhaust fan 52, the stop state is maintained in step S162.

When the image is determined to be a high-luminance frame, the process proceeds to step S107→step S108→step S112→step S151→step S153 and the temperature adjustment device is caused to perform the heating function.

That is, in step S153, the solid-state light source control unit 14 instructs the fan control unit 17 to drive the fans so that air-blowing by the intake fan 51 and the exhaust fan 52 is caused to start.

In addition, in step S154, the solid-state light source control unit 14 instructs the electric heating coil control unit 16 to turn off the electric heating coils 190. Then, the process returns to step S105.

During a period in which the high-luminance frame continues, the process proceeds to step S107→step S108→step S112→step S151→step S152→step S105 and the state of the heating function of the temperature adjustment device (the electric heating coils are turned on and the fans are driven) is maintained.

When the high-luminance frame ends, the process proceeds to step S107→step S108→step S112→step S151→step S152→step S161 and the state of the cooling function of the temperature adjustment device (the electric heating coils are turned on and the fans are driven) is caused to end. That is, in this case, the state in which the electric heating coils are turned off is maintained in step S161 and the fan control unit 17 is instructed to stop the intake fan 51 and the exhaust fan 52 in step S162.

When the image is determined to be an intermediate-luminance frame, the initial state (the electric heating coils are turned off and the driving of the fans is stopped) remains in steps S161 and S162 and a loop of step S107→step S108→step S112→step S151→step S152→step S105 is performed.

When the projection ends, the process of the solid-state light source control unit 14 proceeds from step S105 to step S106 and a process of ending the projection is performed. That is, the solid-state light source control unit 14 instructs the light source current control unit 15 to put the solid-state light source out so that the light emitted by the laser light source 131 is caused to stop.

In addition, the solid-state light source control unit 14 gives an instruction to stop a temperature adjustment operation. That is, the solid-state light source control unit 14 instructs the electric heating coil control unit 16 to turn off the electric heating coils 190. In addition, the fan control unit 17 is instructed to stop the driving of the fans so that the intake fan 51 and the exhaust fan 52 are caused to stop.

By performing the foregoing process of FIG. 15, the heating function for the laser light source 131 is performed during the projection of the low-luminance image. Accordingly, the light emission efficiency of the laser light source 131 can be lowered and the luminance of the image can be further darkened.

On the other hand, the cooling function for the laser light source 131 is performed during the projection of the high-luminance image. Accordingly, the light emission efficiency of the laser light source 131 can increase, the luminance of the image can be increased, and thus a bright image can be projected.

The process examples according to the first to fifth embodiments have been described above, but more various process examples are considered.

For example, in the case of a high-luminance image, a process example in which the temperature adjustment device is caused to merely perform the cooling function is considered.

In addition, a process example in which the heating function is caused to be performed only at the time of a whole black image or a process example in which in which the cooling function is caused to be performed only at the time of a whole white image can also be considered.

In particular, in a case in which each process example is applied, the input signal determination unit 12 may determine that only a whole black image (a whole black image frame) is a low-luminance image (a low-luminance frame) or may determine that only a whole white image (a whole white image frame) is a high-luminance image (a high-luminance frame).

6. Conclusion and Modification Examples

In the foregoing embodiments, the following advantageous effects can be obtained.

The projector device 400 according to the first to fifth embodiments includes:
the light source device 100 configured to use a solid-state light source such as the laser light source 131 or an LED;
a temperature adjustment device configured to set a state in which a temperature of at least the solid-state light source is caused to increase;
a determination unit (the input signal determination unit 12) configured to determine a luminance state of an image to be projected; and
a control unit (the solid-state light source control unit 14) configured to control the temperature adjustment device on the basis of a determination result.

As the temperature adjustment device, the electric heating coils 190, the fans (the intake fan 51 and the exhaust fan 52), the heatsink driving unit 41, and the heatsink 40 have been exemplified and can promote an increase in the temperature of at least the solid-state light source or can set a state in which the increase in the temperature of the solid-state light source is permitted. Thus, when the luminance state of the image to be projected is, for example, a predetermined state such as a low-luminance state, the temperature of the solid-state light source is increased to lower light emission efficiency.

By controlling a temperature state of the solid-state light source on the basis of the determination result of the luminance state of the image to be projected, it is possible to adjust the light emission efficiency of the solid-state light source in accordance with the image. Then, by lowering the light emission efficiency, it is possible to efficiently drop the luminance. For example, by further lowering the luminance of a black image, it is possible to realize an improvement in a contrast ratio.

Note that, in the embodiments, the input signal determination unit 12 and the solid-state light source control unit 14 are illustrated as different blocks, but may be realized as an integrated processing function in a single microcomputer, central processing unit (CPU), or digital signal processor (DSP).

The projector device 400 according to the first to fifth embodiments includes the image generation unit 200 configured to generate an image using light sent from the light source device 100 and the projection unit 300 configured to project the image generated by the image generation unit 200.

Then, the input signal determination unit 12 determines a luminance state of an image generated by the image generation unit 200 as the image to be projected by analyzing the image signal Sin, and the solid-state light source control unit 14 controls the temperature adjustment device on the basis of a determination result of the luminance state.

In a case of a structure in which light emitted from the solid-state light source is radiated with regard to the image generated in the image generation unit 200 to generate projection light, the temperature of the solid-state light source is caused to increase to lower the light emission efficiency when the luminance state of the image to be projected is a predetermined state.

Thus, in a general structure of the projector device 400, it is possible to realize an improvement in the contrast ratio by lowering the light emission efficiency of the light source device 100.

In the first to fifth embodiments, in a case in which it is determined that the image to be projected is a low-luminance image, the solid-state light source control unit 14 controls the temperature adjustment device to set a state in which the temperature of the solid-state light source is caused to increase (S109, S110, and S111 of FIGS. 10, 12, and 15).

That is, in the case of the low-luminance image, the temperature of the solid-state light source is caused to increase to lower the light emission efficiency.

By causing the temperature adjustment device to increase the temperature of the solid-state light source when the image is an image with low luminance, for example, a whole black image or a low-luminance image close to whole black image, it is possible to realize a black image with lower luminance. Thus, it is possible to considerably improve the contrast ratio.

In the first to fifth embodiments, in a case in which the image to be projected is a whole black image, the input signal determination unit 12 determines that the image is a low-luminance image.

That is, in the case of the whole black image, the light emission efficiency is caused to be lowered by causing the temperature of the solid-state light source to increase.

Thus, in the case of the whole black image, it is possible to realize the deeply faded black image and it is possible to considerably improve the contrast ratio.

In the first to fifth embodiments, in a case in which it is determined that the image to be projected is not at least the low-luminance image, the solid-state light source control unit 14 controls the temperature adjustment device to set a state in which the temperature of the solid-state light source is caused to decrease (S102, S103, and S104 of FIGS. 10 and 12 and S153 and S154 of FIG. 15).

That is, in a case in which the image is not the low-luminance image, an increase in the temperature of the solid-state light source is caused to be avoided to increase the light emission efficiency. In a case in which the image is not in low luminance, a clearer high-luminance image can be realized by not lowering the light emission efficiency or increasing the light emission efficiency. This also considerably contributes to the improvement in the contrast ratio.

As in the fifth embodiment, it is effective to perform cooling when the image is determined to be a high-luminance image with a certain level or more in addition of the determination in which the image is not the low-luminance image.

In the first to fifth embodiments, in a case in which the image to be projected is a whole white image, the solid-state light source control unit 14 controls the temperature adjustment device to set a state in which the temperature of the solid-state light source is caused to decrease (S102, S103, and S104 of FIGS. 10 and 12 and S153 and S154 of FIG. 15).

In the case of the whole white image, by avoiding the increase in the temperature of the solid-state light source and increase the light emission efficiency, a higher-luminance image can be realized in the case of the whole white image, and thus it is possible to realize an improvement in the contrast ratio.

The input signal determination unit 12 in the first to fifth embodiments determines the luminance state of the image to be projected in a frame unit of the image signal Sin for generating a projection image. That is, a luminance signal value (gray scale value) is analyzed using each frame or intermittent frames of the image signal Sin as a frame unit and it is determined whether or not an image of the frame is a low-luminance image.

Thus, it is possible to determine in real time whether or not an image is a low-luminance image such as a whole black image or an image close to whole black, and it is possible to appropriately control the temperature adjustment device in accordance with a situation at that time.

In the second embodiment, in a case in which the solid-state light source control unit 14 controls an operation of the temperature adjustment device on the basis of a detection output of the temperature sensor 60 that detects a temperature state of the solid-state light source (S142 and S132 of FIG. 10).

By detecting the temperature of the solid-state light source, it is possible to perform appropriate temperature adjustment to maintain, increase, or lower the light emission efficiency in accordance with the current temperature of the solid-state light source. Thus, it is possible to control the light emission efficiency accurately in accordance with an image.

Note that even in a case in which an image is not a whole black image or a whole white image, control based on the detection output of the temperature sensor 60 may be performed.

In the third and fourth embodiments, the solid-state light source control unit 14 controls an operation of the temperature adjustment device on the basis of a detection output of luminance of illumination light or projected light detected by the luminance sensor (61 or 62) disposed in the image generation unit 200 or the projection unit 300 (S142 and S132 of FIG. 10).

By detecting the luminance of the illumination light or the projected light and performing appropriate temperature adjustment to maintain, increase, or lower the light emission efficiency in accordance with a current luminance, it is possible to control the light emission efficiency accurately in accordance with the image.

In the embodiments, the electric heating coil 190 that heats the solid-state light source has been provided as one temperature adjustment device. The solid-state light source can be heated by the electric heating coil to lower the light emission efficiency of the solid-state light source. However, in the case of the electric heating coil, good reactive heating is possible. For example, in the case of a whole black image, it is possible to realize lowering of the luminance with good response.

In addition, the heatsink driving unit 41 that moves the heatsink 40 corresponding to the solid-state light source so that heat transfer from the solid-state light source is lowered has been exemplified as one temperature adjustment device.

By causing the heatsink to be moved to control heat transfer efficiency to the heatsink and causing heat dissipation ability from the solid-state light source to be variable, it is possible to adjust the temperature.

In addition, the intake fan 51 and the exhaust fan 52 have been described as one temperature adjustment device. However, good reactive heating is possible by an air cooling function of the fans. For example, in the case of a whole white image, it is possible to realize an increase in the luminance with good response.

Other various kinds of temperature adjustment devices can be considered.

By switching an air-blowing path inside the casing of the light source device 100, the air-blowing path to the solid-state light source may be switched to increase or decrease an air cooling function.

In addition, it can also be considered that an air cooling function can be turned on/off by opening or closing a part in the air-blowing path, for example, a heat exhaust hole.

In addition, the temperature is considered to be adjusted using a Peltier device.

In addition, the temperature is considered to be adjusted by dipping the solid-state light source by liquid cooling.

In addition, the temperature is considered to be adjusted by hitting an electromagnetic wave to the solid-state light source. As the electromagnetic wave, a gamma ray, an X-ray, an ultraviolet ray, a visible ray, an infrared ray, a submillimeter wave, a millimeter wave, a centimeter wave, a microwave, an ultrashort wave, a short wave, a middle wave, a long wave, an ultralong wave, an ultralow frequency wave, or the like is considered.

In addition, the temperature is considered to be adjusted by surrounding the casing of the light source device 100 with a box (for example, a dustproof box or the like) and mounting an air conditioner in the box.

Note that a device that increases the temperature of at least the solid-state light source can be used as the temperature adjustment device. The device also includes a temperature adjustment device that maintains the temperature. That is, a temperature adjustment device capable of maintaining the temperature consequently even when a situation in which the temperature is dropped occurs is included in the device capable of increasing the temperature of the solid-state light source.

For example, the temperature adjustment device may be a device that performs heating or maintains heat in a situation in which lowering of the temperature of the solid-state light source progresses by lowering an output level off a laser light source or an LED or maintaining the heat to maintain the temperature the solid-state light source consequently. For example, by avoiding an increase in light emission efficiency by lowering the temperature at the time of display of a whole black image or a low-luminance image so that the luminance of the black image is not raised, it is possible to prevent a contrast ratio from being lowered. Accordingly, when the temperature adjustment device is caused to function so at least the temperature is maintained even when the temperature does not increase consequently, it is effective to improve image quality by maintaining the contrast. That is, the temperature adjustment device may be a device capable of realizing an increase in the temperature or maintenance of the temperature of the solid-state light source.

The projector device 400 according to the embodiments is suitable for each of a projector for business, a projector for home cinema, and a projector for digital cinema.

In the case of the projector for business, projected light is used for still images such as presentation document or the like in many cases, and thus a change in a gray scale is intense (white→black→white, . . . ). In this case, a quality improvement effect is high because of luminance adjustment through temperature adjustment. Accordingly, it is preferable to steeply perform a temperature adjustment operation by the electric heating coil/the fan/the movable heatsink, or the like.

In addition, in the case of the projector for home cinema or the projector for digital cinema, projected light is used for moving images such as movies in many cases and thus there is concern of a steep operation resulting in lowering of quality. Accordingly, it is desirable to gradually perform the temperature adjustment operation by the electric heating coil/the fan/the movable heatsink, or the like.

In the embodiments, the projector device using the liquid crystal light valves has been exemplified. However, the technology of the present disclosure can be appropriately applied to a digital light processing (DLP) projector device as long as the projector device is a projector device in which a solid-state light source is used.

Note that the advantageous effects described in the present specification are merely exemplary and are not limited and other advantageous effects may be achieved.

Additionally, the present technology may also be configured as below.

(1)

A projector device including:

a light source device configured to use a solid-state light source;

a temperature adjustment device capable of setting a state in which a temperature of at least the solid-state light source is caused to increase;

a determination unit configured to determine a luminance state of an image; and a control unit configured to control the temperature adjustment device on the basis of a determination result of the determination unit.

(2)

The projector device according to (1), including:

an image generation unit configured to generate an image using light sent from the light source device; and a projection unit configured to project the image generated by the image generation unit, in which the control unit controls the temperature adjustment device on the basis of a determination result of a luminance state determined by the determination unit on the image generated by the image generation unit as an image to be projected.

(3)

The projector device according to (1) or (2), in which, in a case in which the determination unit determines that the image is a low-luminance image, the control unit controls the temperature adjustment device to set a state in which the temperature of the solid-state light source is caused to increase.

(4)

The projector device according to (3), in which, in a case in which an image is a whole black image, the determination unit determines that the image is a low-luminance image.

(5)

The projector device according to any of (1) to (4), in which, in a case in which the determination unit determines that the image is not at least a low-luminance image, the control unit controls the temperature adjustment device to set a state in which the temperature of the solid-state light source is caused to decrease.

(6)

The projector device according to any of (1) to (4), in which, in a case in which the determination unit determines that an image is a whole white image, the control unit controls the temperature adjustment device to set a state in which the temperature of the solid-state light source is caused to decrease.

(7)

The projector device according to any of (1) to (6), in which the determination unit determines the luminance state of the image in a frame unit of an image signal for generating a projection image.

(8)

The projector device according to any of (1) to (7), in which the control unit controls an operation of the temperature adjustment device on the basis of a detection output of a temperature sensor that detects a temperature state of the solid-state light source.

(9)

The projector device according to (2), in which the control unit controls an operation of the temperature adjustment device on the basis of a detection output of luminance of illumination light or projected light detected by a luminance sensor disposed in the image generation unit or the projection unit.

(10)

The projector device according to any of (1) to (9), in which an electric heating coil that heats the solid-state light source is provided as one of the temperature adjustment devices.

(11)

The projector device according to any of (1) to (10), including:

a heatsink driving unit configured to cause a heatsink corresponding to the solid-state light source to be moved so that heat conduction from the solid-state light source is lowered, as one of the temperature adjustment devices.

(12)

A control method for a projector device including a light source device using a solid-state light source, the control method including:

determining a luminance state of an image; and controlling a temperature adjustment device on the basis of a determination result of the determination unit, the temperature adjustment device being capable of setting a state in which a temperature of at least the solid-state light source is caused to increase.

REFERENCE SIGNS LIST 10 driving control unit
11 input terminal
12 input signal determination unit
13 light valve control unit
14 solid-state light source control unit
15 light source current control unit
16 electric heating coil control unit
17 fan control unit
18 heatsink control unit
21 solid-state light source temperature determination unit
22 projected-light luminance determination unit
23 illumination light luminance determination unit
40 heatsink
41 heatsink driving unit
51 intake fan
52 exhaust fan
60 temperature sensor
61 luminance sensor
62 luminance sensor
100 light source device
131 laser light source
141 mounting substrate
190 electric heating coil
200 image generation unit
240R, 240G, 240B liquid crystal light valve
300 projection unit
400 projector device
AR laser light source array

The invention claimed is:

1. A projector device comprising:
a light source configured to use a solid-state light source; and
an active heater disposed in front of the light source in a light exiting direction and spaced apart from the light source in the light exiting direction with at least a collimator lens and a planar mirror disposed in a space between the active heater and the light source when viewed from a side direction, the active heater being configured to surround the light source and to set a state in which a temperature of at least the solid-state light source is caused to increase; and
circuitry configured to
determine a luminance state of an image, and
control the active heater on a basis of a determination result of the luminance state of the image.

2. The projector device according to claim 1, wherein the circuitry is further configured to:
the image using light sent from the light source, and
project the generated image,
wherein the circuitry controls the active heater on a basis of a determination result of a luminance state on the image generated as an image to be projected.

3. The projector device according to claim 1, wherein, in a case in which the circuitry determines that the image is a low-luminance image, the circuitry controls the active heater to set a state in which the temperature of the solid-state light source is caused to increase.

4. The projector device according to claim 3, wherein, in a case in which an image is a whole black image, the circuitry determines that the image is a low-luminance image.

5. The projector device according to claim 1, wherein, in a case in which the circuitry determines that the image is not at least a low-luminance image, the circuitry controls the active heater to set a state in which the temperature of the solid-state light source is caused to decrease.

6. The projector device according to claim 1, wherein, in a case in which the circuitry determines that an image is a whole white image, the circuitry controls the active heater to set a state in which the temperature of the solid-state light source is caused to decrease.

7. The projector device according to claim 1, wherein the circuitry determines the luminance state of the image in a frame unit of an image signal for generating a projection image.

8. The projector device according to claim 1, wherein the circuitry controls an operation of the temperature adjustment device on a basis of a detection output of a temperature sensor that detects a temperature state of the solid-state light source.

9. The projector device according to claim 2, wherein the circuitry controls an operation of the active heater on a basis of a detection output of luminance of illumination light or projected light detected by a luminance sensor.

10. The projector device according to claim 1, wherein the active heater is an electric heating coil that heats the solid-state light source.

11. The projector device according to claim 1, wherein the circuitry is further configured to:
cause a heatsink corresponding to the solid-state light source to be moved so that heat conduction from the solid-state light source is lowered.

12. A control method for a projector device including a light source using a solid-state light source, the control method comprising:
determining a luminance state of an image; and controlling an active heater on a basis of the luminance state of the image, the active heater being disposed in front of the light source in a light exiting direction and spaced apart from the light source in the light exiting direction with at least a collimator lens and a planar mirror in a space between the active heater and the light source when viewed from a side direction, the active heater being configured to surround the light source and to set a state in which a temperature of at least the solid-state light source is caused to increase.

* * * * *